(12) United States Patent
Nasserbakht et al.

(10) Patent No.: US 10,706,111 B1
(45) Date of Patent: Jul. 7, 2020

(54) WEARABLE ELECTRONIC DEVICE WITH MULTIPLE DETACHABLE COMPONENTS

(71) Applicant: ENORCOM Corporation, Los Altos, CA (US)

(72) Inventors: Gitty N. Nasserbakht, Los Altos, CA (US); Mitra Nasserbakht, Los Altos, CA (US)

(73) Assignee: ENORCOM Corporation, Los Altos, CA (US)

( * ) Notice: Subject to any disclaimer, the term of this patent is extended or adjusted under 35 U.S.C. 154(b) by 0 days.

(21) Appl. No.: 15/474,721

(22) Filed: Mar. 30, 2017

Related U.S. Application Data

(63) Continuation of application No. 14/339,154, filed on Jul. 23, 2014, which is a continuation of application
(Continued)

(51) Int. Cl.
| | |
|---|---|
| *H04M 3/00* | (2006.01) |
| *G06F 16/951* | (2019.01) |
| *G06F 15/78* | (2006.01) |
| *H04M 1/725* | (2006.01) |
| *G06Q 10/10* | (2012.01) |

(Continued)

(52) U.S. Cl.
CPC ........ *G06F 16/951* (2019.01); *G06F 15/7807* (2013.01); *G06F 16/116* (2019.01); *G06F 16/335* (2019.01); *G06F 16/93* (2019.01); *G06Q 10/1093* (2013.01); *H04M 1/72522* (2013.01); *H04M 1/72527* (2013.01); *H04W 4/025* (2013.01); *H04W 4/60* (2018.02); *G06F 16/48* (2019.01); *G06Q 30/0261* (2013.01)

(58) Field of Classification Search
CPC ......... G06F 17/30864; G06F 17/30011; G06F 17/30076; G06F 17/30699; G06F 17/30038; G06F 15/7807; H04W 4/60; H04W 4/025; G06Q 10/1093; G06Q 30/0261; H04M 1/72522; H04M 1/72527; H04M 1/0254; H04M 1/7253; H04B 1/385
See application file for complete search history.

(56) References Cited

U.S. PATENT DOCUMENTS 4,644,246 A * 2/1987 Knapen .................. H02K 37/02
310/156.01
5,845,005 A 12/1998 Setlak et al.
(Continued)

FOREIGN PATENT DOCUMENTS

WO      WO-03025696 A2    3/2003
WO      WO-2006004786 A1   1/2006

OTHER PUBLICATIONS

"Microsoft Computer Dictionary", 5th Edition, Microsoft Press, Redmond, WA, (2002), 64-65.
(Continued)

*Primary Examiner* — Barry W Taylor
(74) *Attorney, Agent, or Firm* — Schwegman Lundberg & Woessner, P.A.

(57) ABSTRACT

Disclosed herein is an electronic device with multiple independently functional components capable of sharing information through a connector channel that in one embodiment is worn on the body of the user with automatic attachment and detachment capability including via external communication or command.

16 Claims, 22 Drawing Sheets

Related U.S. Application Data

No. 13/674,526, filed on Nov. 12, 2012, now Pat. No. 8,805,441, which is a continuation of application No. 12/163,878, filed on Jun. 27, 2008, now Pat. No. 8,326,353.

(60) Provisional application No. 60/965,104, filed on Aug. 17, 2007, provisional application No. 60/946,618, filed on Jun. 27, 2007.

(51) Int. Cl.
| | |
|---|---|
| H04W 4/02 | (2018.01) |
| H04W 4/60 | (2018.01) |
| G06F 16/93 | (2019.01) |
| G06F 16/11 | (2019.01) |
| G06F 16/335 | (2019.01) |
| G06Q 30/02 | (2012.01) |
| G06F 16/48 | (2019.01) |

(56) References Cited

U.S. PATENT DOCUMENTS

| | | | |
|---|---|---|---|
| 5,933,515 | A | 8/1999 | Pu et al. |
| 6,038,315 | A | 3/2000 | Strait et al. |
| 6,144,358 | A | 11/2000 | Narayanaswamy et al. |
| 6,169,575 | B1 | 1/2001 | Anderson et al. |
| 6,256,737 | B1 | 7/2001 | Bianco et al. |
| 6,259,782 | B1 | 7/2001 | Gallant |
| 6,311,063 | B1 | 10/2001 | Valliani et al. |
| 6,434,668 | B1 | 8/2002 | Arimilli et al. |
| 6,487,561 | B1 | 11/2002 | Ofek et al. |
| 6,507,912 | B1 | 1/2003 | Matyas, Jr. et al. |
| 6,810,414 | B1 | 10/2004 | Brittain |
| 6,944,478 | B1 | 9/2005 | Durand |
| 7,047,236 | B2 | 5/2006 | Conroy et al. |
| 7,127,239 | B2 | 10/2006 | Ogman et al. |
| 7,337,468 | B2 | 2/2008 | Metzger |
| 7,415,662 | B2 | 8/2008 | Rothmuller et al. |
| 7,603,139 | B1 | 10/2009 | Tom |
| 7,606,560 | B2 | 10/2009 | Labrou et al. |
| 7,636,733 | B1 | 12/2009 | Rothmuller |
| 7,650,409 | B2 | 1/2010 | Cain et al. |
| 7,657,227 | B2 | 2/2010 | Doan et al. |
| 7,657,270 | B2 | 2/2010 | Hicks, III et al. |
| 7,680,491 | B2 | 3/2010 | Zabawskyj et al. |
| 7,711,152 | B1 | 5/2010 | Davida et al. |
| 7,714,709 | B1 | 5/2010 | Daniel |
| 7,724,717 | B2 | 5/2010 | Porras et al. |
| 7,777,689 | B2 | 8/2010 | Fratti et al. |
| 7,796,013 | B2 | 9/2010 | Murakami et al. |
| 7,831,264 | B2 | 11/2010 | Miegel |
| 7,930,629 | B2 | 4/2011 | Hurst-Hiller et al. |
| 7,956,742 | B2 | 6/2011 | Lupoli et al. |
| 7,957,401 | B2 | 6/2011 | Zalenski et al. |
| 7,995,995 | B2 | 8/2011 | Novack et al. |
| 8,281,136 | B2 | 10/2012 | Ramakrishna |
| 8,311,513 | B1 | 11/2012 | Nasserbakht et al. |
| 8,326,353 | B1 | 12/2012 | Nasserbakht et al. |
| 8,375,088 | B2 | 2/2013 | Glasgow |
| 8,495,020 | B1 | 7/2013 | Nasserbakht et al. |
| 8,805,441 | B1 | 8/2014 | Nasserbakht et al. |
| 8,868,036 | B1 | 10/2014 | Nasserbakht et al. |
| 8,897,760 | B1 | 11/2014 | Nasserbakht et al. |
| 9,201,885 | B1 | 12/2015 | Nasserbakht et al. |
| 9,509,674 | B1 | 11/2016 | Nasserbakht et al. |
| 9,542,493 | B1 | 1/2017 | Nasserbakht et al. |
| 2001/0034836 | A1 | 10/2001 | Matsumoto et al. |
| 2001/0041056 | A1 | 11/2001 | Tanaka et al. |
| 2001/0043514 | A1* | 11/2001 | Kita ................... A44C 5/0015 368/281 |
| 2002/0013874 | A1* | 1/2002 | Gelke ................ G06F 13/4018 710/305 |
| 2002/0077129 | A1 | 6/2002 | Kikuta et al. |
| 2002/0123325 | A1 | 9/2002 | Cooper |
| 2002/0173339 | A1 | 11/2002 | Safadi |
| 2003/0033296 | A1 | 2/2003 | Rothmuller et al. |
| 2003/0041263 | A1 | 2/2003 | Devine et al. |
| 2003/0045270 | A1 | 3/2003 | Agrawal et al. |
| 2003/0105725 | A1 | 6/2003 | Hoffman |
| 2003/0125072 | A1 | 7/2003 | Dent |
| 2003/0125082 | A1 | 7/2003 | Vanderhelm |
| 2003/0126319 | A1* | 7/2003 | Adusumilli ............ G06F 13/28 710/22 |
| 2003/0217073 | A1 | 11/2003 | Walther et al. |
| 2003/0229542 | A1 | 12/2003 | Morrisroe |
| 2004/0034645 | A1 | 2/2004 | Manabe et al. |
| 2004/0041917 | A1 | 3/2004 | Norcross et al. |
| 2004/0102182 | A1 | 5/2004 | Reith et al. |
| 2004/0167938 | A1 | 8/2004 | Margolus et al. |
| 2004/0168173 | A1 | 8/2004 | Cohen et al. |
| 2004/0203505 | A1 | 10/2004 | Newman et al. |
| 2004/0219902 | A1 | 11/2004 | Lee et al. |
| 2004/0267944 | A1 | 12/2004 | Britt, Jr. |
| 2005/0096518 | A1 | 5/2005 | Chang |
| 2005/0138433 | A1 | 6/2005 | Linetsky |
| 2005/0182944 | A1 | 8/2005 | Wagner et al. |
| 2005/0197844 | A1 | 9/2005 | Ng et al. |
| 2005/0220325 | A1 | 10/2005 | Kinsella |
| 2005/0222933 | A1 | 10/2005 | Wesby |
| 2005/0282529 | A1 | 12/2005 | Thorson et al. |
| 2006/0003782 | A1 | 1/2006 | Jensen et al. |
| 2006/0015405 | A1 | 1/2006 | Bala et al. |
| 2006/0015725 | A1 | 1/2006 | Voice et al. |
| 2006/0068812 | A1 | 3/2006 | Carro et al. |
| 2006/0105754 | A1 | 5/2006 | Jagadeesan et al. |
| 2006/0121939 | A1 | 6/2006 | Anwar et al. |
| 2006/0156385 | A1 | 7/2006 | Chiviendacz et al. |
| 2006/0166715 | A1 | 7/2006 | Van Engelen et al. |
| 2006/0187717 | A1 | 8/2006 | Hsieh |
| 2006/0242241 | A1 | 10/2006 | Tock et al. |
| 2006/0282886 | A1 | 12/2006 | Gaug |
| 2007/0011261 | A1 | 1/2007 | Madams et al. |
| 2007/0028105 | A1 | 2/2007 | Hynek |
| 2007/0032240 | A1 | 2/2007 | Finnegan et al. |
| 2007/0050396 | A1* | 3/2007 | Cheng ...................... G06F 16/40 |
| 2007/0061881 | A1 | 3/2007 | Eyre |
| 2007/0100666 | A1 | 5/2007 | Stivoric et al. |
| 2007/0115940 | A1 | 5/2007 | Kamen et al. |
| 2007/0142024 | A1 | 6/2007 | Clayton et al. |
| 2007/0167136 | A1 | 7/2007 | Groth |
| 2007/0174906 | A1 | 7/2007 | Burchett et al. |
| 2007/0182582 | A1 | 8/2007 | Booher et al. |
| 2007/0196096 | A1 | 8/2007 | Naruse |
| 2007/0250920 | A1 | 10/2007 | Lindsay |
| 2007/0260862 | A1 | 11/2007 | Mcfarling |
| 2007/0273518 | A1 | 11/2007 | Lupoli et al. |
| 2007/0279852 | A1* | 12/2007 | Daniel ................. A44C 5/0007 361/679.03 |
| 2007/0291661 | A1 | 12/2007 | Nishibayashi et al. |
| 2007/0293275 | A1 | 12/2007 | Kalinichenko et al. |
| 2007/0294403 | A1 | 12/2007 | Verona |
| 2007/0300164 | A1 | 12/2007 | Bhogal et al. |
| 2007/0300288 | A1* | 12/2007 | Choi .................... H01R 13/639 726/2 |
| 2008/0005087 | A1 | 1/2008 | Sato et al. |
| 2008/0018459 | A1 | 1/2008 | Derrick et al. |
| 2008/0021834 | A1 | 1/2008 | Holla et al. |
| 2008/0045161 | A1 | 2/2008 | Lee et al. |
| 2008/0062625 | A1 | 3/2008 | Batio |
| 2008/0068292 | A1 | 3/2008 | Yuan et al. |
| 2008/0072063 | A1 | 3/2008 | Takahashi et al. |
| 2008/0086759 | A1 | 4/2008 | Colson |
| 2008/0117679 | A1 | 5/2008 | Srinivasan et al. |
| 2008/0117839 | A1 | 5/2008 | Raju et al. |
| 2008/0130957 | A1 | 6/2008 | Small |
| 2008/0153670 | A1 | 6/2008 | Mckirdy et al. |
| 2008/0168135 | A1 | 7/2008 | Redlich et al. |
| 2008/0189496 | A1* | 8/2008 | Raczynski ............ G06F 19/321 711/161 |
| 2008/0201302 | A1 | 8/2008 | Kimchi et al. |
| 2008/0222706 | A1 | 9/2008 | Renaud et al. |
| 2008/0243696 | A1 | 10/2008 | Levine |

(56) References Cited

U.S. PATENT DOCUMENTS

| | | | |
|---|---|---|---|
| 2008/0244410 A1* | 10/2008 | Schormann | G06F 3/04886 715/723 |
| 2008/0288573 A1 | 11/2008 | Bellotti et al. | |
| 2008/0289032 A1 | 11/2008 | Aoki et al. | |
| 2009/0195379 A1 | 8/2009 | Joy et al. | |
| 2009/0207187 A1 | 8/2009 | Lee | |
| 2009/0235087 A1 | 9/2009 | Bird | |
| 2009/0240949 A9 | 9/2009 | Kitchens et al. | |
| 2009/0259588 A1 | 10/2009 | Lindsay | |
| 2010/0058106 A1 | 3/2010 | Srinivasan et al. | |
| 2010/0173620 A1 | 7/2010 | Hicks, III | |
| 2010/0255829 A1 | 10/2010 | Forte | |
| 2012/0088481 A1 | 4/2012 | Postma et al. | |
| 2014/0335848 A1 | 11/2014 | Nasserbakht et al. | |
| 2015/0095158 A1 | 4/2015 | Nasserbakht et al. | |

OTHER PUBLICATIONS

"Microsoft Computer Dictionary", 5th Edition, Microsoft Press, Redmond, WA, (2002), 7 pgs.

Abowd, Gregory D, et al., "The Family Video Archive: An annotation and browsing environment for home movies", MIR '03, Berkeley, CA, [Online]. Retrieved from the Internet: <http://delivery.acm.org/1 0.1145/980000/973266/p1-abowd.pdf?key1 =973266 &key2=9710583711_&coll=&dl=acm&CFID=15151515 &CFTOKEN=6184618>, (Nov. 7, 2003), 8 pgs.

Bloehdorn, Stephan, et al., "TagFS—Tag Semantics for Hierarchical File Systems", WWW 2006, Edinburgh, UK, (May 22-26, 2006), 6 pgs.

Patel, Shwetak, et al., "The ContextCam: Automated Point of Capture Video Annotation", UbiComp 2004, LNCS 3205, Springer-Verlag, Berlin, Germany, (2004), 18 pgs.

* cited by examiner

Module A

Wallet- Sized Display w/Wireless Connectivity

Letter- Size Display w/ Wireless Connectivity

User 1

User 2

User 3

WEARABLE ELECTRONIC DEVICE WITH MULTIPLE DETACHABLE COMPONENTS

This application is a continuation application of U.S. patent application Ser. No. 14/339,154, filed Jul. 23, 2014; which is a continuation application of U.S. patent application Ser. No. 13/674,526, filed Nov. 12, 2012, now U.S. Pat. No. 8,805,441, issued on Aug. 12, 2014; which is a continuation application of U.S. patent application Ser. No. 12/163,878, filed Jun. 27, 2008, now U.S. Pat. No. 8,326,353, issued on Dec. 4, 2012; which application claims the benefit of Provisional U.S. Patent Application No. 60/946,618, filed on Jun. 27, 2007, and Provisional U.S. Patent Application No. 60/965,104, filed Aug. 17, 2007, each of which is incorporated herein by reference in its entirety.

FIELD OF THE INVENTION

At least one embodiment of the present invention pertains to mobile electronic devices for communication, entertainment and/or organization such as advanced mobile phones and other similar devices, and more particularly, to a mobile device with customizable functionality and form factor.

BACKGROUND

Consumer electronic devices such as mobile electronic devices have undergone significant technological advances in recent years. Availability of advanced silicon technology, processing power, memory and advanced input/output (I/O) and display systems as well as an increasing level of communication bandwidth. including next generation wireless cellular as well as WiFi/WiMax wireless broadband technologies. enable the building of more-sophisticated devices.

Currently the majority of device innovations concentrate around increasing the computing capability of wireless handsets. In some cases, wireless handsets of today are more powerful than supercomputers of decades ago. More memory, processing power and bandwidth are available today, and the end consumer is able to generate and receive orders of magnitude more information compared to just a few short years ago. However, innovations in the areas of customization, organization and advanced services remain behind the computational power increases. In fact, since the first major PDAs were introduced nearly 20 years ago, there has been little done to solve the organizational needs of consumers besides having access to an electronic version of a paper calendar. Despite the many available electric devices, the majority of the population is still relying on paper calendars due to their ease of use, reliability and lower cost and the few additional benefits offered by their electronic counterparts.

The architecture of advanced mobile devices in the prior art is a highly integrated solution which does not allow for modularization and detachability of components. The goal of most advanced mobile phone designs is to maximize the computing power of the device to support as many features as possible and allow for future programmability and application development. This dictates a very high level of integration. At the core of this architecture is a high-powered integrated processor that controls all processes within the mobile device. The integrated processor incorporates multiple micro-processing cores and digital signal processors enabling the device to run as a general purpose machine. The architecture generally utilizes a hybrid approach to control the various components and programs running on the device. Overall it employs a PC-like environment with a general purpose operating system (OS) which is capable of running any number of programs which comply with its OS standards.

On the other hand, it needs to incorporate mechanisms for support of real time applications such as phones. Building a general-purpose engine to accommodate future programming and application capabilities as well as making the device broadly applicable to a large number of usage scenarios by various device manufacturers inherently requires a significant amount of overhead, significant wasted memory and computing resources, both passively as well as during runtime, to accommodate mostly unused features. It also significantly increases the effective number of clock cycles per useful operation, the clock frequency required to run the device in order to obtain a reasonable response time for critical application steps, resulting in significant power consumption and cost.

To accommodate the general-purpose characteristic of the architecture, a significant number of compromises are made, and as a result, the performance of frequently used features can suffer due to interruptions and accommodations made for such general-purpose items. In some cases, this has led to phones that take a long time to boot up, thus jeopardizing the main features of the device. In some cases, they drain the device battery to an unacceptable level, disabling critical functions such as emergency calling as well as increase the turn-on time and device response time to a point of noticeable difference and delay in human interaction, especially upon starting up the device, eliminating the highly desired instant-on feature of the device.

FIG. 1 shows the block diagram of an example of the current architecture. The integrated processor includes a number of sub-processors, such as general purpose programmable computing cores and digital signal processors, memory blocks, and drivers for a large number of peripheral devices which may be attached to the device. Advanced mobile devices are designed to provide maximum integration and provide maximum programmability. The functionality needed by the majority of mobile consumers, however, does not include an arbitrarily large number of features and applications.

SUMMARY

One aspect of the technique introduced here is a mobile device that includes a core engine to control operation of the mobile device, and a plurality of modules coupled to the core engine, where each module is dedicated to perform a different one of a plurality of functionality classes of the mobile device, and each of the plurality of modules contains its own processing element and memory. The mobile device has user-customizable functionality according to a user's needs and/or desires. The mobile device may be in the form of a multi-function mobile electronic system with distributed memory and processing elements. Such system can include functionally distinct and independently operable intelligent sub-systems (e.g., modules) which together form a multi-functional mobile electronic system while sharing information with and/or through a master subsystem (e.g., a core engine). The sub-systems can also share a data exchange block. The sub-systems can further share tag information with and/or through the master subsystem. The system is easily extendable to add additional functionality by adding additional functionally distinct and independently operable sub-systems.

Another aspect of the technique introduced here is a mobile device with a user-customizable physical form factor. The mobile device may be in the form of multi-function mobile electronic system with distributed memory and processing elements, with the ability to attach and detach from the main system chassis (housing) at the manufacturing stage, assembly stage, post-packaging, or post-sale stage. The functionally distinct and independently operable intelligent sub-systems together form a multi-functional mobile electronic system while sharing tag information with and/or through the master subsystem via shared connectors, with applicable control signals to enable such sharing.

Another aspect of the technique introduced here is a mobile device with one or more detachable intelligent displays for communication to, and/or as access to, mobile device and/or other devices. Further, a mobile device can be shared through use of such intelligent detachable displays. Independently operational small module displays can be combined to form a large display for the mobile device. The mobile device may include, or have associated with it, a plurality of independently operable display devices, which are combinable to form a single larger display device for the mobile device.

Another aspect of the technique introduced here is a time-based information system (TIBIS) with event-based storage, access and retrieval functionality, which can be used in a mobile device such as described above and/or other type of processing system. The TIBIS can include information storage and organization (i.e., a file system) that is based on time instead of file locations in a directory. Further, it can include temporary storage and organization of event, information tags, or content in user-specified or machine-defined time intervals in a short-term memory (STM). It further can include long-term or permanent storage and organization of events, information tags, or content in user-specified or machine-defined time intervals in a long-term memory (LTM). Such long-term or permanent storage and organization of event, information tags, or content may be implemented with no ability to rewrite the memory. The STM may be implemented as local non-volatile memory of the mobile device. The LTM may also be implemented as non-volatile memory, which may be local memory of the mobile device, which may be removable, or it may be remote memory on a network.

The TIBIS can include a method for capture, storage and retrieval of information in an information storage device such as a mobile electronic system based on a multi-category tagging mechanism covering temporal, geographical/location, context as well as user-defined concepts. This can involve generation, storage, distribution of multi-modal tagging of events in an electronic apparatus such as a mobile information device. It can also include a method for fast hardware-based search and retrieval of information based on the multi-modal tag system. The TIBIS provides information archiving based on time-based organization without disk fragmentation, the need for multiple backup, or the possibility of tampering with data.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
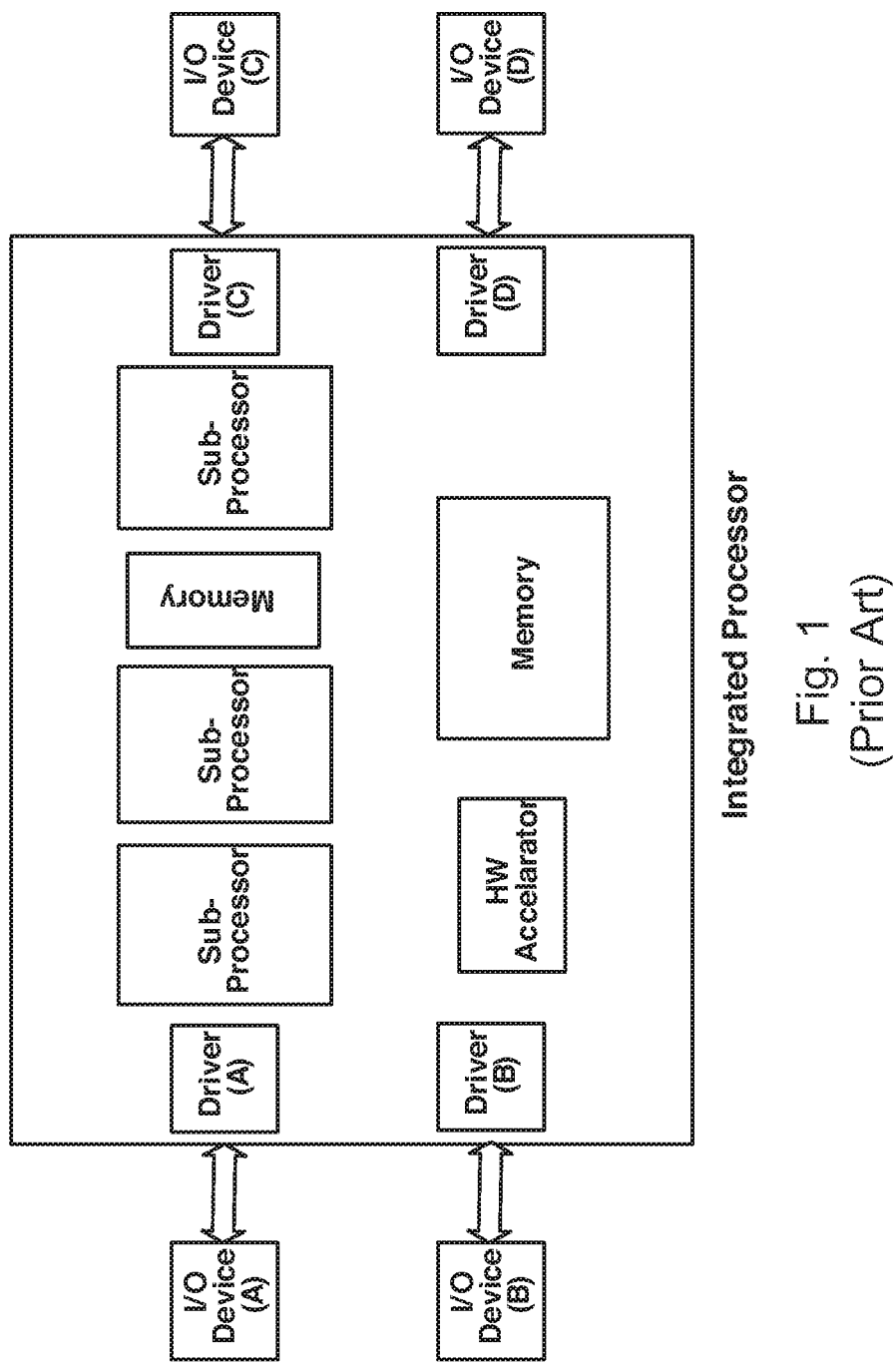
FIG. 1 is a block diagram showing the architecture of a mobile device in the prior art.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

A "mobile device", as the term is used herein, means any device that is designed to be worn by a person, carried in an article of clothing or personal accessory (e.g., a purse), or easily carried in one hand by a person. As noted above, the functionality needed by the majority of users of mobile devices does not include an arbitrarily large number of features and applications. Having the technology for massive computation assembled at many places, it is desirable to alleviate the mobile device from area- and power-consuming functionality that is available almost everywhere. In its place, it is desirable to make the mobile device perform the functions that are essential for mobility (e.g. voice, text, video capture, storage and display, etc.) in the most robust fashion.

The present invention provides a robust solution for addressing the organizational needs of mobile consumers by providing, among other things, a new customizable mobile device, optimized for mobile usage, which provides customizability, lower cost, lower power, and better pedormance. A time-based intelligence system (TIBIS™) is also introduced, which allows for robust storage, access, and processing of information on the mobile device.

(1) Customizable Mobile Device (C.E.O.™)

(1A) Mobile Device with User-Customizable Functionality

The present invention offers consumers the ability to choose the functionality and form factor they desire in a mobile device. Each of these modules may be dedicated to perform a specific type of user-level functionality, such as voice communication, text, video capture, storage, display, location determination, games, etc. "User-level" functionality means functionality that is directly perceivable by a human user of the device.

The approach introduced here allows users the flexibility of using the components that they need and none of the ones that they do not need, allowing for customizability and reduction in cost and power dissipation.

Communicate/Entertain/Organize (C.E.O™) is a mobile platform introduced here that allows people to communicate, entertain, and organize their mobile life. The mobile device uses "ultra thin client" architecture with custom-designed dedicated hardware for functions that need to be performed on the handset. The design removes the need for a multitude of programmable multi-function cores. This architecture results in high performance, fast response time, and very low-power consumption. In addition, this architecture allows users access to a rich set of customized applications based on their needs from the network, if needed.

One aspect of CEO is a modularized architecture for a mobile device ("Modularized Mobile Architecture"). The modularized nature of this architecture allows for the ability to choose the functional modules that are combined to make a mobile device. This gives the ability to exchange and upgrade the functional modules over time. For this functionality, customization and flexibility, a level of service is established with the customer (user) making the device of their choice and giving the customer the ability to upgrade easily over time. For example, one functional module may be a communication module, which can be upgraded if a faster communications technology becomes available to the user, without the need to discard the entire mobile device.

Figure 2:
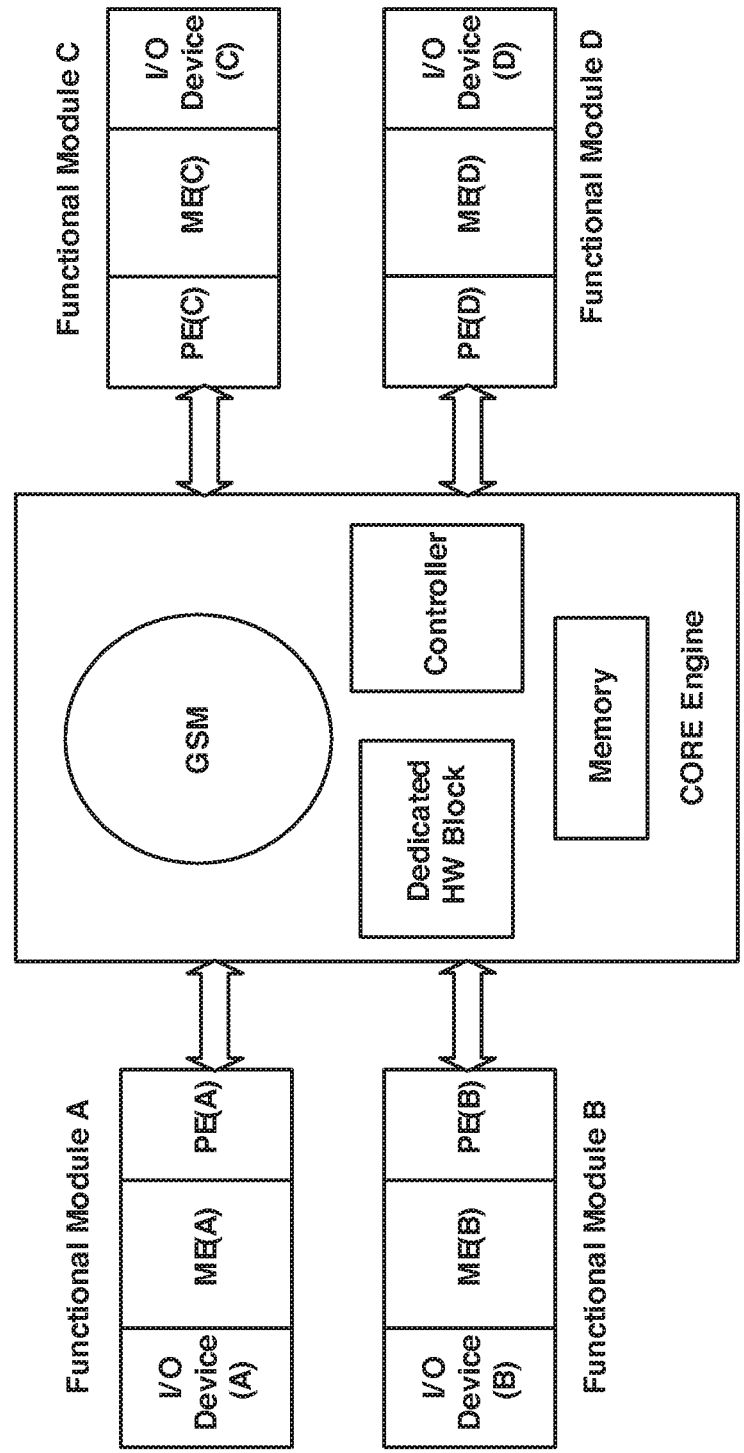
FIG. 2 is a block diagram showing an example of the architecture of a mobile device in accordance with the techniques introduced here.

FIG. 2 shows a block diagram of the Modularized Mobile Architecture according to one embodiment. The architecture separates out the functional blocks for each major device function and removes large, power consuming general purpose processors as well as the accompanying shared memory hierarchy. Each functional module has its own dedicated processing element (PE) and memory element (ME). The PE in each functional module can be, for example, a programmable microcontroller, application-specific integrated circuit (ASIC), programmable logic device (PLD), or other similar device or a combination of such devices. The ME in each functional module can be, for example, random access memory (RAM), read-only memory (ROM), flash memory, or other type of memory, or a combination of such types of memory.

The functional modules can include, for example, any one or more of: a communication module (e.g. 3G), audio module, video module, GPS module and game module. By optimizing the PE to the specific functions being performed by its functional module, it is possible to reduce the underlying area and power consumption of each functional module. Performance of each PE is better than the unified processing case with an integrated processor due to function specialization as well as the reduction in area, which facilitates timing requirements, placement and reliability of the PEs within each module. In some cases the performance and area savings are such that they allow for choosing an older generation process technology while still maintaining the performance requirements, which results in reduced manufacturing costs and overall component cost of the device.

By providing separate memory for each functional unit, the majority of issues with memory bottleneck are eliminated. Each functional module has its own dedicated memory and MEs are not shared resources, as is the case in traditional architectures. In other words, instead of separate memories for instruction and Data for the whole system, this architecture allows for separate memory for each application-specific area for the mobile space.

This approach has many advantages over traditional architectures. It allows for robust information sharing mechanism among functional modules. In addition, it is possible to make significant improvements to the choice of technology used for the memory blocks to properly optimize for the type of data being stored in that specific memory element. Depending on the type of stored data and usage patterns, it is possible to vary the block size and read and write specifications of each memory element. The architecture preserves and enhances the functionality of each individual functional unit while allowing these units to communicate with extremely low overhead.

The CEO engine is a very efficient hardware-optimized engine that facilitates the communication between the modules and provides the central functionality of the mobile device. The mobile device is designed to accommodate specific functionalities for the mobile environment rather than provide unlimited programmability. The significant manipulations of data that occur in the mobile device are a set of operations designed for the functionality of the device, such as the following:

CAPTURE
STORAGE
RETRIEVAL
SEARCH
DISPLAY
TRANSMIT

Figure 3:
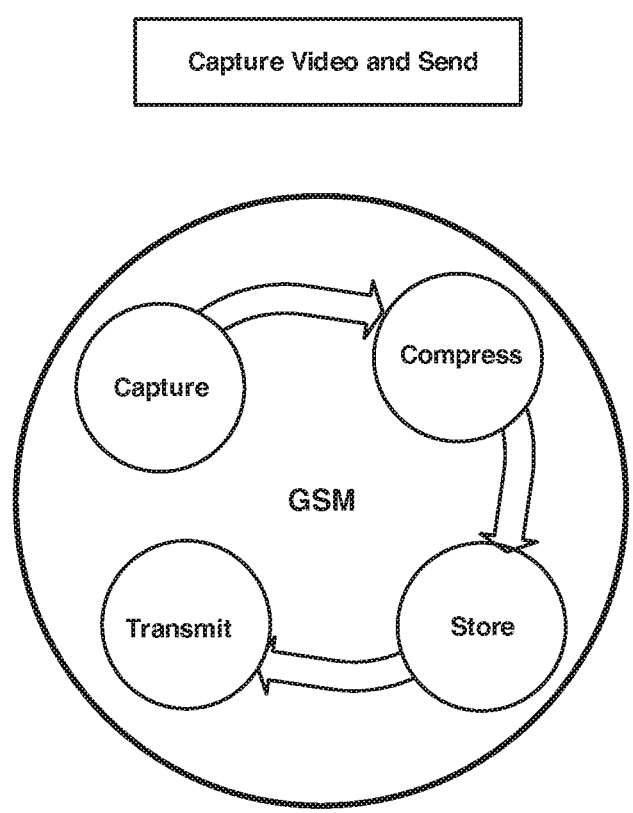
FIG. 3 illustrates an example of the operation of the giant state machine (GSM)

Making these operations extremely efficient and not allocating resources for unused functionality greatly reduces cost, increases performance significantly and reduces power utilization. In a simplified manner, the CEO engine implements a Giant State Machine (GSM) which is designed to control the device functionality in very high speed in pure hardware (i.e., without the use of software). An example of such an operation is capturing an image from the camera module and sending the image out to the wireless communication module, which involves Capture, Compress, Store and Transmit operations. The GSM orchestrates these operations by generating the appropriate control signals. FIG. 3 shows the GSM operation for this example.

The Modularized Mobile Architecture allows for robust and intelligent sharing of information among functional modules instead of sharing resources, and it resolves one of the major overheads associated with management of shared resource. A major part of the tasks performed by a traditional operating system (OS) is resource management and interrupt control. This allows the system to manage access to shared resources such as memory. In the Modularized Mobile Architecture introduced here, the significant computational overhead associated with a traditional OS as well as the memory requirements to store active as well as passive components of such OS is eliminated.

The memory architecture is designed so that a small portion of the memory contents in each functional module, namely a set of extracted and stored "tags", are communicated to the CEO engine and to other functional modules as needed (the memory architecture is described below in relation to TIBIS). As a result, a very robust interface is developed between the CEO Engine and each functional module. This architecture allows for robust and intelligent sharing of information instead of sharing resources.

Figure 4:
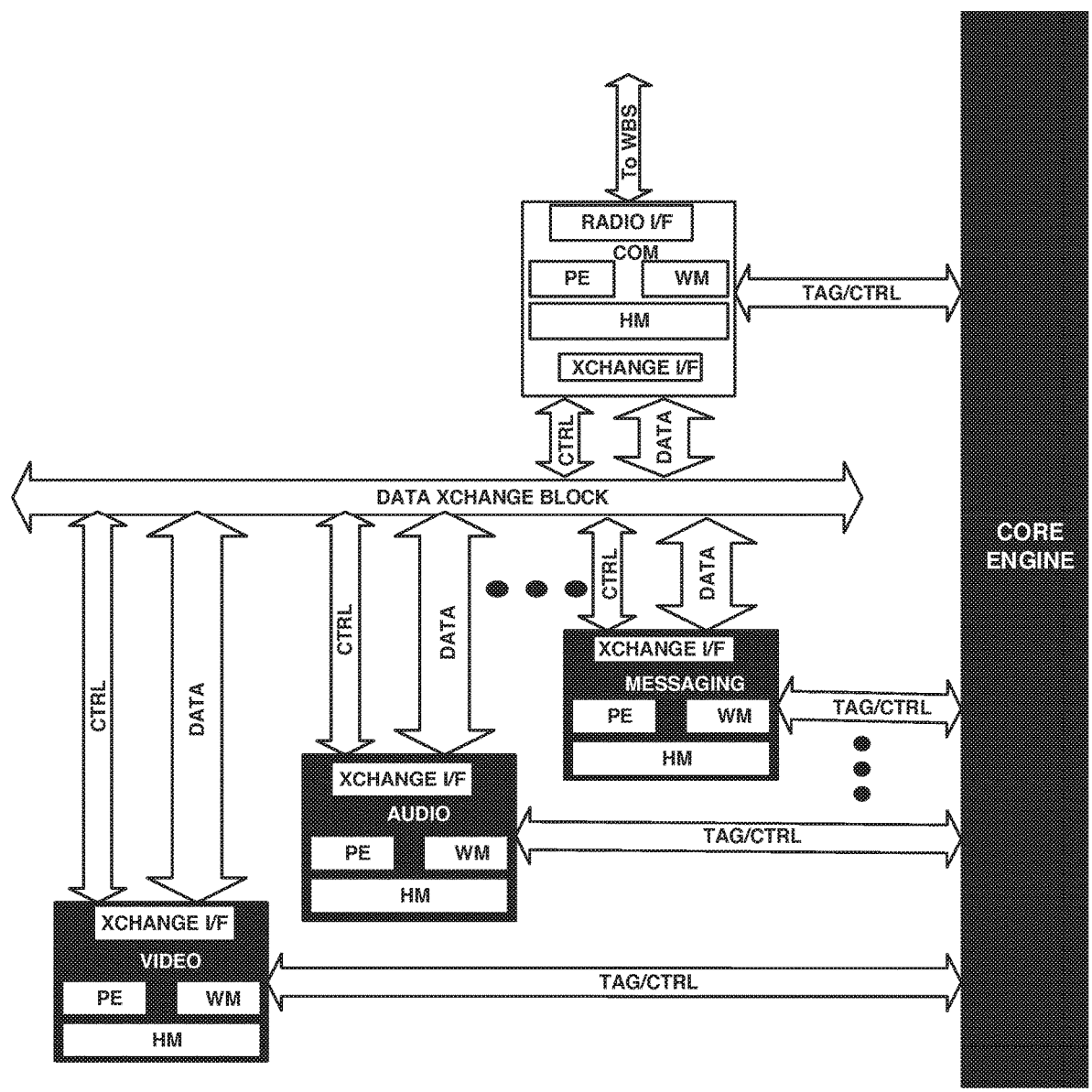
FIG. 4 illustrates the data flow between various functional modules and the communication/entertainment/organization (CEO) engine in a mobile device.

FIG. 4 illustrates the data flow between various functional modules and the CEO engine in a mobile device, according to one embodiment. The ME in each functional module is divided between working memory (WM) and Horizontal Repository Memory (HM). WM is preferably a form of RAM, while HM is preferably a form of nonvolatile memory, such as flash memory. Each functional module communicates directly with the CEO engine, and the CEO engine orchestrates any required interaction between functional modules. The CEO engine also generates the required permissions for module designation for transmit and receive on the data exchange block. The data exchange block is a bus designed for fast, efficient transfer of data among modules as necessary. An exchange interface unit is included in each functional module to allow for this communication. The bit width, impedance, signal integrity and data transfer rates are optimized for a given cost model, performance requirement, and available connector technology.

In one embodiment, programmable elements are included in the exchange interface unit in each module to allow for flexibility in the design. This programmability allows the signaling parameters to be adjusted depending on the requirements for the best available technology. For example, it allows for sufficient buffering of data for proper assembly and disassembly and timing of data to match the best available signaling for the data exchange block.

While the individual memory blocks shown in FIG. 4 can be physically separate memory devices, this is not a requirement, and the memory units can all or partly reside on the same physical memory device; however, each memory block is distinctly assigned to a functional module, hence, there is no sharing of the same block of memory. Initially the memory units are assigned to various functional modules based on the application as well as user requirements. The memory allocation can be dynamically re-allocated based on need. For example, when a functional module is not being used, the associated memory can be allocated to other modules, or if a functional module has a need for expanded memory usage and there is unused memory assigned to other functional modules, it can be re-allocated. In addition, the modular architecture allows for the ability to upgrade the memory for each functional module as needed.

(1B) Mobile Device with User Customizable Physical Form Factor

The mobile device architecture introduced above can integrate various electronic modules into a single customized device. The Modularized Mobile Architecture allows for customization of device functionality based on user preferences. This customization can occur at any of several levels:

1. The modularized architecture can be applied to the design of the mobile device at the chip level. Each functional block is optimized and the chosen modules are all implemented on one chip. This allows for customization at the chip level and results in highest performance but least flexibility.

2. The choice of modules can be made at the package level, where selected functional modules fabricated on small micro-boards are assembled to produce the device. Alternatively, advanced packaging techniques are used to integrate each functional module on a single package (e.g. multi-chip-module, ball-grid-array (BGA) package, etc.). Selected functional modules are assembled to build the customized mobile device. This level of customization is done at the factory and offers customization to the user without significantly altering the manufacturing process. In this implementation, the device is customizable by the user at purchase order time and the modularity of the design is exploited at the factory to provide the user the customized solution desired; however, the device is not physically detachable by the user, so its flexibility is limited since the user can not reconfigure the device after delivery.

3. The third method of delivering customization is the most flexible. In this approach, the functional modules and the mobile device core housing are delivered to the user and the user can attach or detach some of the modules at the point of use. This allows for the customization to occur both at the functional level as well as the physical level and offers the most flexible option.

The customized mobile device allows users the flexibility of using the components that they need and none of the ones that they do not need, by allowing for the integration of a variety of modules that perform communication, computing, and a variety of input and output functions. It results in lower cost and power dissipation. It can provide freedom from the choice of service provider by allowing the user to keep desired electronic components as well as stored information while having the freedom to change service provider (i.e., to change the communication module). It also removes the requirement of building multiple standard radio devices on the same mobile device (e.g. cellular, WiFi, Bluetooth); only radios that the user plans to use are added. It also provides an easy upgrade path for the components that the user desires with new nodes of technology without the need to replace the entire device.

Each module can be a functional module that is operable only within a mobile device, or it can be an independently (individually) operable component. Independently operable components have some level of user interface as needed by that module and can be used on their own. When a module is inserted into the mobile device, it has access to an expanded set of functionality for storage, display, I/O and communication facilities. While some modules can connect together directly (e.g., the audio module can be directly connected to the communication module), the modules are typically connected to the CEO engine on the mobile device.

Figure 5A:
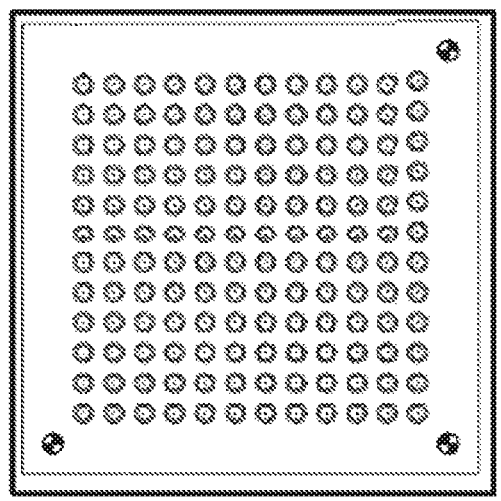
FIG. 5A shows a functional module in a micro-BGA package, such as may be associated with one embodiment.
Figure 5B:
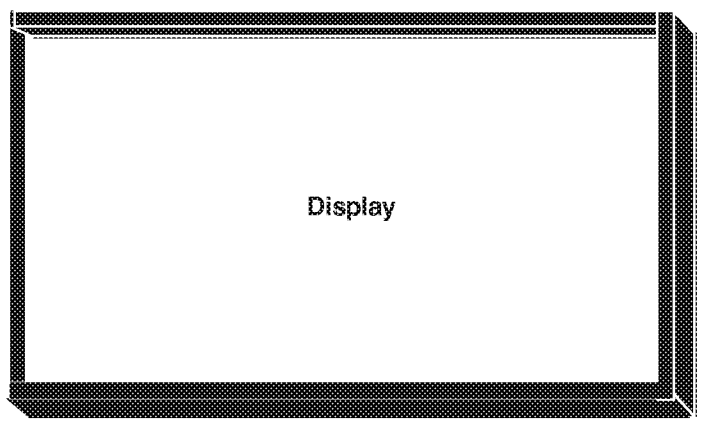
FIG. 5B shows an example of the display of a mobile device such as may be used in conjunction with the functional module in FIG. 5A.
Figure 5C:
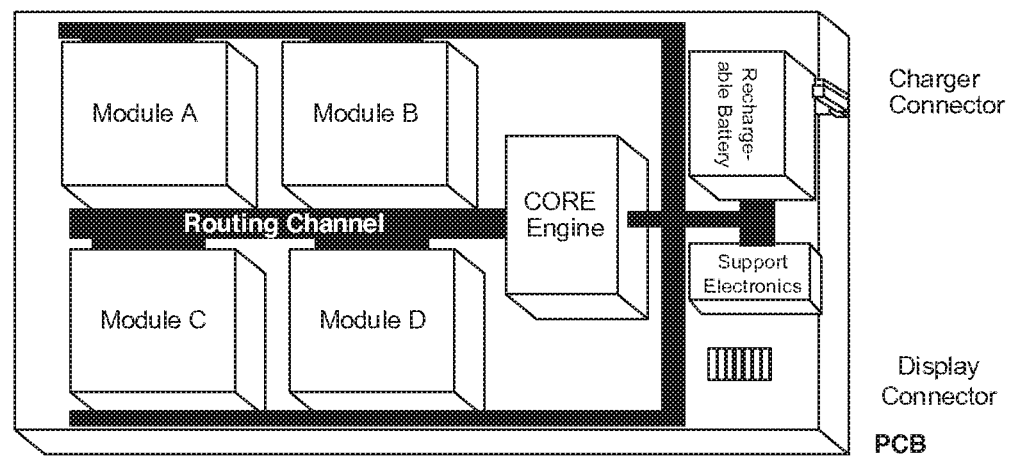
FIG. 5C shows an example of a circuit board on which are mounted various functional modules and a CEO engine.
Figure 5D:
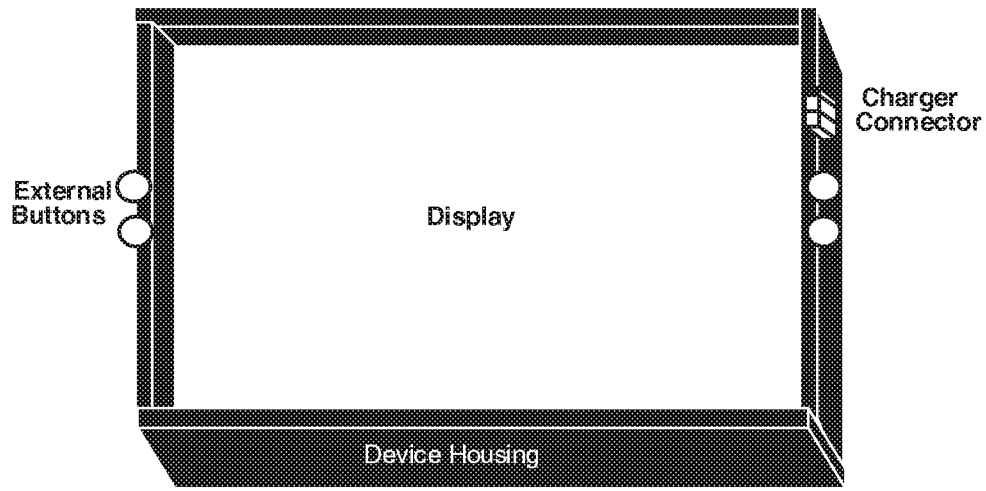
FIG. 5D shows an example of an external view of the assembled mobile device, according to the embodiment of FIGS. 5A through 5C.
Figure 6A:
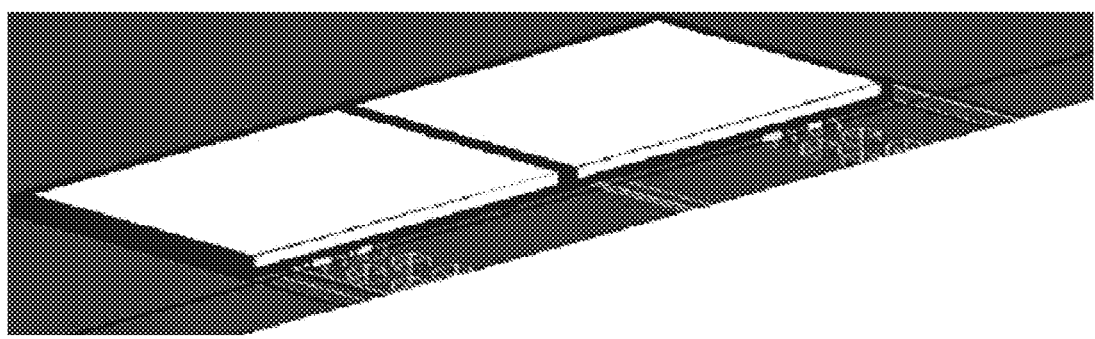
FIGS. 6A and 6B show embodiments of functional modules connecting to a circuit board at the factory.
Figure 6B:
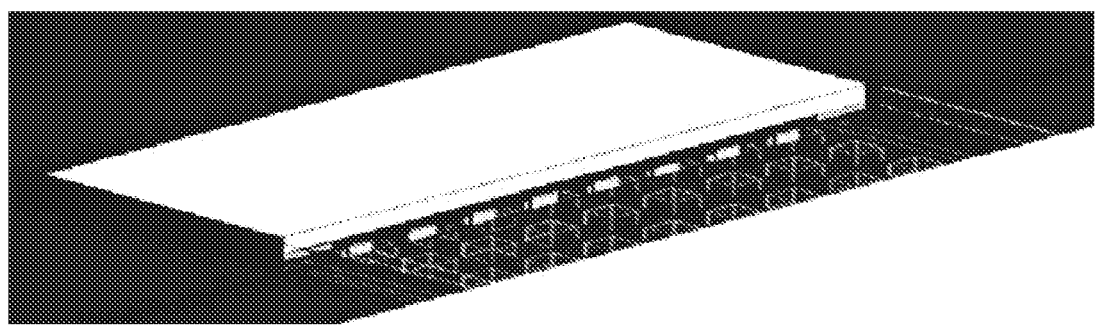

FIGS. 5A through 5D show an embodiment of a mobile device which has functional modules integrated at packaging level. Each functional module is integrated in a micro-ball grid array (BGA) package. FIG. 5A shows a functional module in a micro-BGA package. The functional modules and the CEO engine are integrated on a printed circuit board (PCB). FIG. 5C shows an example of a PCB on which are mounted various functional modules and the CEO engine. The interconnections are made through the routing channels on the PCB. The PCB is then encased inside the mobile device housing. The display is placed on top surface of the device and attached to the PCB through the display connector. FIG. 5B shows an example of the display of the mobile device such as may be used in conjunction with the functional module in FIG. 5A. FIG. 5D shows an example of an external view of the assembled mobile device. FIGS. 6A and 6B show embodiments of functional modules connecting to a PCB at the factory.

FIG. 7 shows another embodiment of a customized mobile device, which has detachable functional modules. FIG. 7A shows a detachable functional module. In this embodiment, the functional modules do not have individual displays. Four modules are connected to the device through the connector channel placed at the center of the device. FIG. 7C shows multiple detachable functional modules connected to a connector channel. The CEO engine is placed on a PCB at the bottom of the device and is connected to the modules through the connector at the bottom of the connection channel. FIG. 7D shows a CEO engine and other components of the mobile device connected to a circuit board. The modules, connector channel, and PCB are housed inside the mobile device housing. An LCD display is placed on top of the device. FIG. 7B shows a display device that may be used in conjunction with the functional modules in FIG. 7A. FIG. 7E shows the functional modules and connector channel of FIG. 7C mounted within the device housing. FIG. 7F shows an example of an external view of the assembled mobile device.

FIG. 8 shows another embodiment of the customized mobile device with detachable components. In this embodiment, each of the functional modules has its own individual display device. The modules are slipped into the mobile device housing and connect to the connection channel as described above. On top of the mobile device, there is an opening in the top surface of the housing for the display units. These modules are independently operable and each module uses its own small display in the stand-alone mode of operation. The CEO engine keeps track of the modules that are connected and sends the appropriate control signals to the circuitry for resizing the image appropriately. Once the modules are connected to the mobile device, the CEO engine recognizes the individual display units that are connected to the device and resizes the screen so the mobile device has a single large display.

Figure 8A:
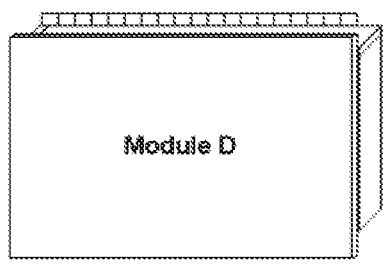
FIG. 8A shows an independently operable functional module with its own display, in detachable form.
Figure 8B:
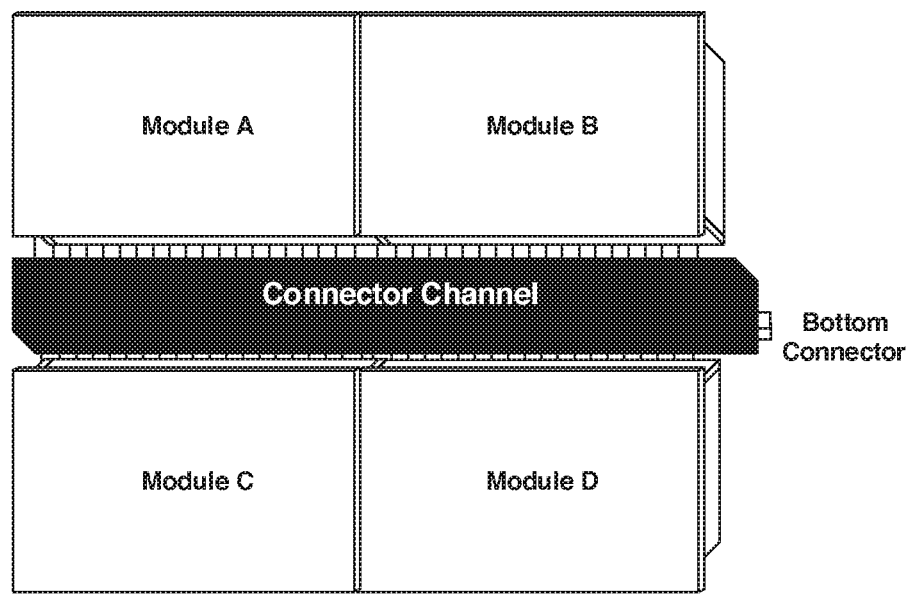
FIG. 8B shows multiple functional modules such as shown in FIG. 8A, connected to a connector channel.
Figure 8C:
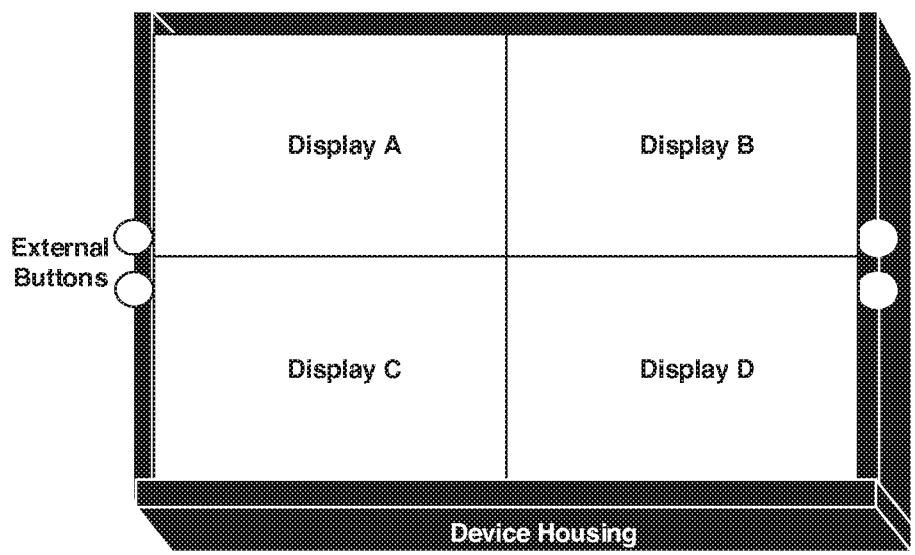
FIG. 8C shows an example of an exterior view of a mobile device which has multiple functional modules such as shown in FIG. 8A, each with its own display, which collectively can be operated as a single larger display.

FIG. 8A shows a detachable, independently-operable functional module with its own display. FIG. 8B shows multiple functional modules such as shown in FIG. 8A, connected to a connector channel. FIG. 8C shows an example of an exterior view of the mobile device which has multiple functional modules such as shown in Figure BA, where the individual display devices of the functional modules collectively can be operated as a single larger display.

All of the functional modules can be powered from the power supply of the mobile device. An independently operable module also has its own on-board battery which is recharged when the module is connected to the main unit.

The module connectors are designed to facilitate the connection between the functional modules and the CEO engine through the data exchange block. In the modularized architecture of the design, the data is exchanged between modules under the control of the CEO engine. The size and characteristics of the data buses from different modules may be different. Instead of designing a custom connector for each module, a unified connector is designed to support all available modules in a particular configuration. The choice of connector depends on the form factor and bus speed. One option is a high-speed serial bus with a small footprint. Another option is a parallel bus for ease of signal routing. In one embodiment, a custom low-profile, parallel edge connector is used. This gives the flexibility of supporting a large number of modules with varying bus sizes and facilitates interconnection between the modules and the main core. Data at the I/O interface of each module is assembled or disassembled to match the connector's data bit width and timing. The CEO engine facilitates the data exchange between the modules through appropriate control signals.

In addition to module choice, the user has the choice of device shape, size, and configuration. The device can have any of a variety of shapes, such as square or rectangular, round, or cylindrical. Modules can be assembled in any of a variety of ways, such as connecting sideways to another module or vertically as stackable disks.

Figure 9:
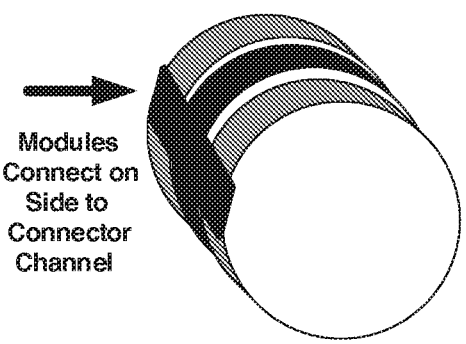
FIG. 9 shows a cylindrical mobile device with additional modules as stackable disks.

FIG. 9 shows an embodiment of a cylindrical mobile device with functional modules connected in a stackable configuration. In the stackable configuration, modules connect on the side to each other through the connection channel in the device housing. In another embodiment, the connections between the stackable modules can be on top and bottom of modules. The connectors are retracted mechanically before a module is connected or disconnected from the device. Modules can connect together directly as well as modules dropping into a device housing/carrier/chassis.

Figure 10:
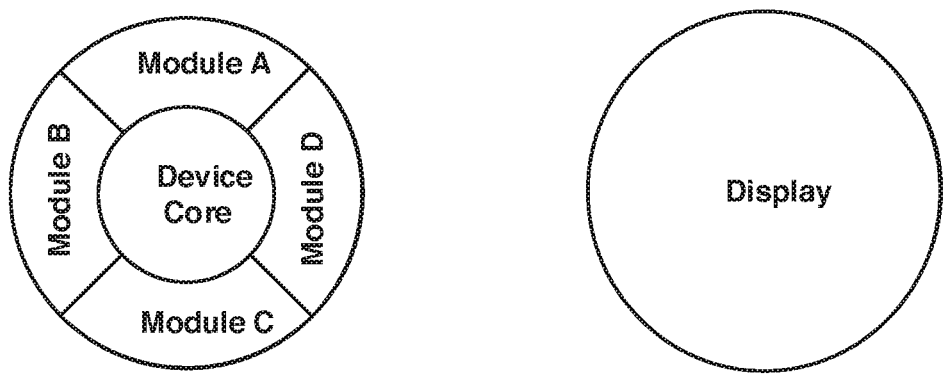
FIG. 10 shows a radial module configuration device with a central core and housing for additional modules around the core.
Figure 11A:
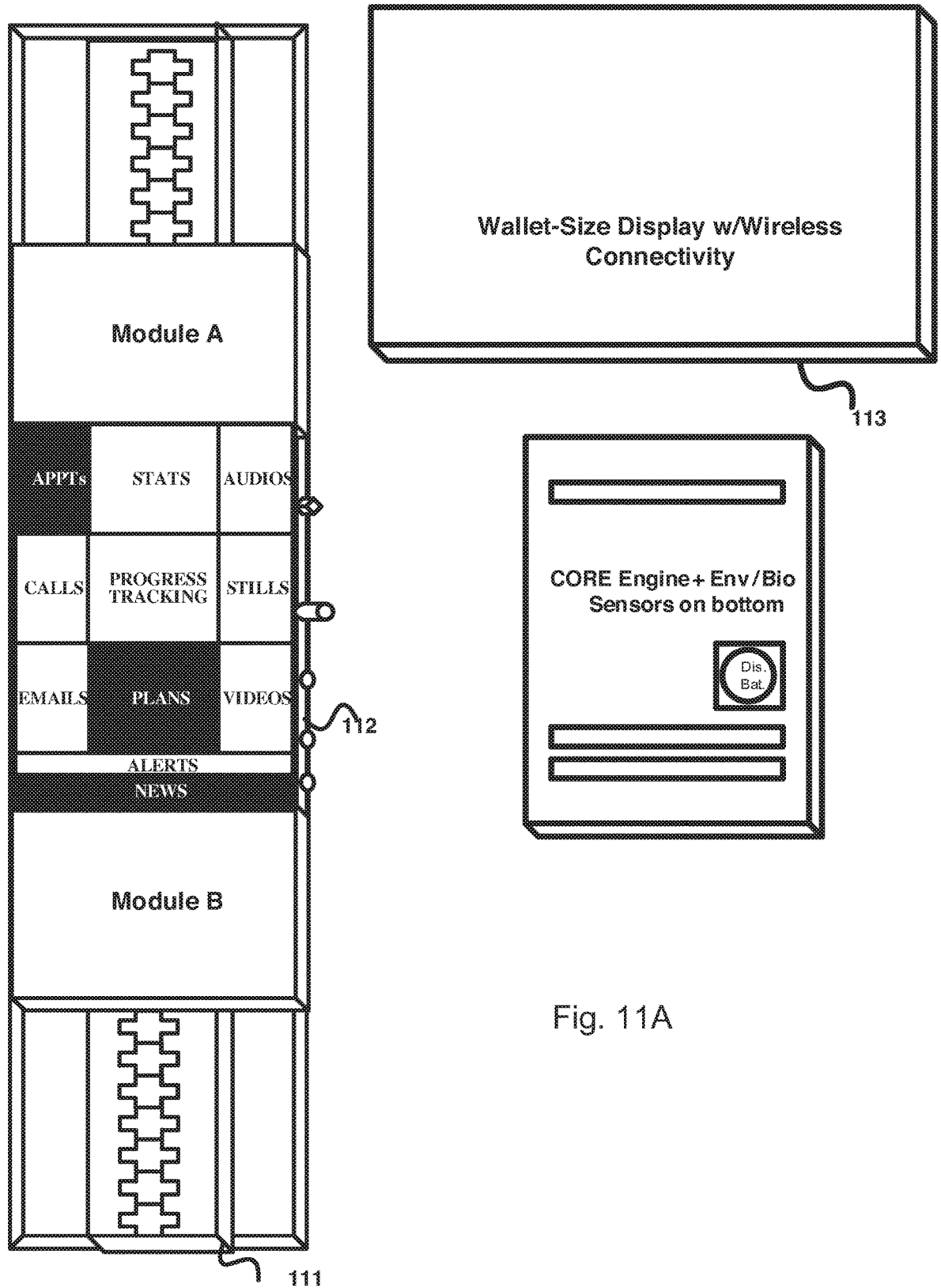
FIG. 11A shows a wrist-top mobile device with an additional detached display unit.
Figure 11B:
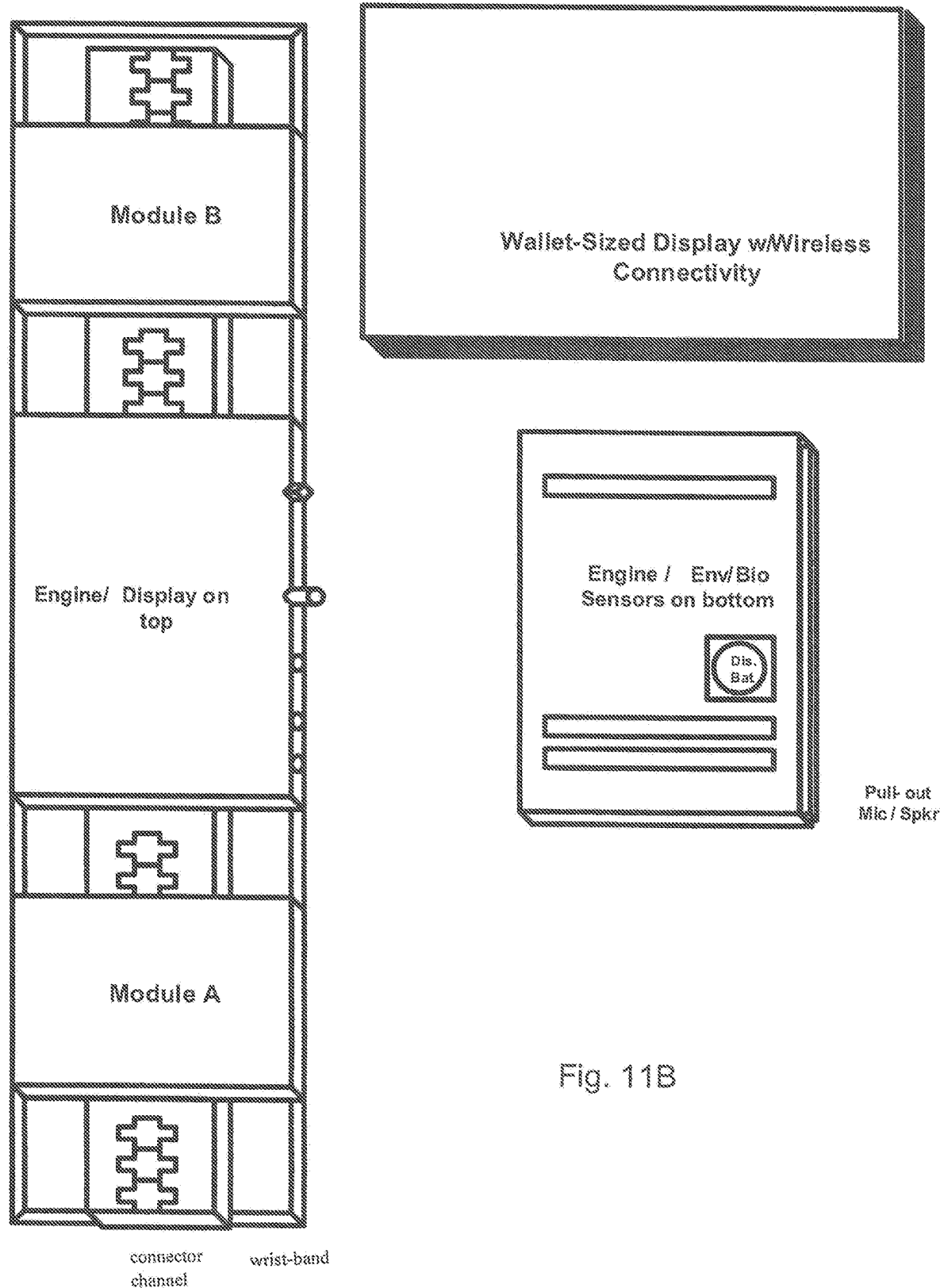
FIG. 11B shows a wrist-top mobile display with an additional detached display unit.
Figure 11C:
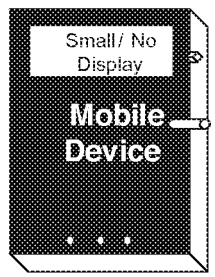
FIG. 11C shows a mobile device, a wrist-top device, an ent/info/connectivity device with additional detached displays of different display features with wireless connectivity.
Figure 11C:
Figure 11C:
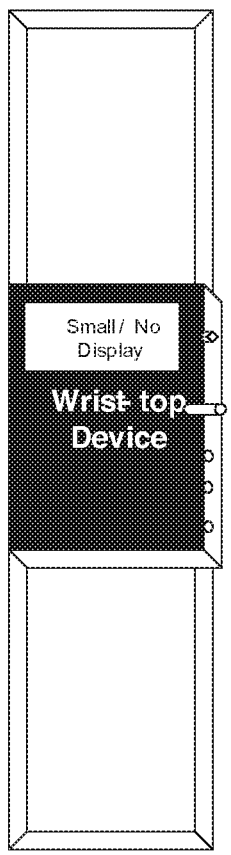
Figure 11C:
Figure 11C:
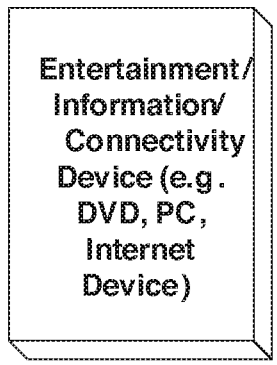
Figure 11D:
FIG. 11D shows a mobile device with multiple detached display units for multiple users.
Figure 11D:
Figure 11D:
Figure 11D:

Other arrangements of modules are dictated by the desired industrial design of the mobile device. FIG. 10 shows a round device with a central core and housing for additional modules around the core. In this case, the modules are inserted inside the device housing and any unused module is left with an empty housing to preserve the overall look of the device.

The user also has the additional choice of having the assembled mobile device in a wrist-top configuration (worn as a watch), a clip-on configuration where it is worn on a belt or armband, a pendant configuration, as an ear-top device or a handheld device.

In one wrist-top configuration, such as shown in FIG. 11, when a phone call is initiated or received, the unit slides out of the wristband 111 and the user holds the device to the ear. Alternatively, the unit includes an optional small pull-out microphone/speaker unit that is used during calls to keep the incoming phone calls private. FIG. 11 shows a wrist-top mobile device, with an example of different types of information/functions shown on the display 112 (e.g., "STATS", "CALLS", "EMAILS", "AUDIOS", "STILLS", "VIDEOS", "PROCESS TRACKING", "PLANS", etc.).

Other detachable modules include audio and video recording and playback modules, GPS tracking and location broadcast module, game module, etc. The platform is also designed for other consumer electronics device functionalities that can be added over time such as bio sensors, health monitoring devices, environmental sensors, etc.

In addition to modules that support common mobile functionality such as audio/video modules, GPS and games, the platform introduced here also supports other consumer electronics device functionalities that can be added over time, such as biosensors, health monitoring devices, environmental sensors, etc. The Modularized Mobile Architecture allows for the functionality of the modules to be developed and optimized independently and can easily integrate essentially any module by modifying the interface to fit the mobile device interface.

Connection made through abutment/overlay/slide through. Modules can connect together directly as well as modules dropping into a device housing/carrier.

The detachability of components occurs at the device level, board-level, and package-level. At the device level, a module is detached by the user depending on the mode of operation. At the board/package level, a section of the board is detached (candy-bar format) as well as employing advanced packaging techniques (including multi-chip module, multi-chip packaging.) These are employed to achieve the highest cost and power efficiency for the end customer based on their final device configuration at the BTO (built-to-order) level without significantly altering the manufacturing process.

While many detachable modules can be independently operable, that is not a requirement. For example, a single memory or display module may not be operable on its own, and there are modules that are supporting accessory hardware for another module. A "super module" can incorporate a number of module functions that are commonly used together.

In one embodiment, the MEs of each individual functional unit are removable and swappable. This allows for quick and fast transfer and sharing of data among devices, as well as quick personal security and backup feature.

Modules in detached mode which are connected to a communications module can be reconfigured over-the-air to support an array of functions in the stand-alone mode. This can be achieved through the use of field programmable logic as well as registers which can be updated remotely to allow for modified mode of operation of the module in a power efficient manner.

Location Tags on Items Activated and Tracked through Cellular Phone Networks

Similar to RFID tags attached to items so their location can be identified, except the tag is equipped with a stripped down version of a cell phone. It can be activated through the cell network and it will send back a signal identifying the location. The location ID can be from cellular tower information or a GPS receiver can also be integrated on the device. In one embodiment, the device is generally off but when tracking is needed, the user turns on the device. In another embodiment, the device is activated continuously and can be tracked if lost or there is a need to locate the device. In another embodiment, the device turns on at a predetermined time interval and looks for a useable wireless network to send its location info. If one is not found, it will try at a later time interval. This is a low-power device but to power the device, a regular battery can be used. If it is attached to an electronic mobile device, it can be powered up by the battery of the device. A solar battery can also be used to power the device and continuously recharge the device. In another embodiment, the device is turned on remotely on demand. Other wide-area communication technologies such as WiMax can be used as the tracking network once they become widely adopted. In one embodiment, the tag device can attach to a special insert so the tag can be used as a small cell phone for voice or text communication if needed. In case of an electronic device that is stolen, the tag can be programmed to disable the device.

Wristband Mobile Device, Cellular Phone Headset and Wrist Combination

One of the form factors that the user can select is a mobile device that is worn on the wrist just like a wrist-band watch is. The watch is universally used as a time keeping device. Most people carry it with them all the time. This invention is a mobile device that contains a cell phone as well as other electronic components of choice such as a camera and is integrated into the form of a wrist-band device that the user can put on in the morning and carry with them through the day. The device can include a microphone and speaker or a headset. For additional privacy, the device could also pick up voice wirelessly through sensors around the face/neck to pick up voice/muscle movements. The keypad can be on the device (touch pad, pull-out/clip-on keypad, rolled-up keypad) or projected from the device onto an external surface or a roll-up screen.

Wireless Communication Device in Earphone

Another embodiment is a mobile communication device that fits in, on, or around the ear. It includes the communication device (e.g. cell phone) as well as the speaker and microphone. It can include a voice-recognition system so phone numbers and other information can be spoken without the need for a keypad. Although the invention does not preclude a more conventional unit with a keypad that after dialing can be put around the ear, removing the need for separate headphones or the use of small keypads with wireless connectivity with the phone.

Privacy Microphone for Mobile Devices

Another embodiment is a microphone for any voice-driven device such as mobile phones where the voice is picked up by sensors placed on the face/neck. In one implementation, the sensors pick up voice in very low volume, in another implementation, the sensors pick up voice through muscle movements. This invention provides for private conversations without the need for using alternative input sources such as text.

Mobile Device w/Battery Recharged (Continuously) with Human Motion

Another embodiment is a mobile device whose battery is recharged by motion. In one implementation, the mobile device is worn by the user (e.g. on the wrist) and the battery is continuously recharged through the motion of the human body. In an alternative implementation, the device is moved around for a period of time to recharge. In another implementation, the device includes an integrated/detachable micro-mechanical crank that is cranked for a period of time to recharge the battery. Depending on the power requirements of the mobile device, the mechanical recharging of the battery could be a supplement to a standard battery used in the device.

(1C) Detachable Intelligent Display

Mobile devices are faced with a continuous need for larger display sizes for certain applications, such as viewing of photos, videos, surfing the web, etc. The large size of the display adds significantly to the size, power dissipation and cost of the mobile device. However, in most applications there s not a continuous need for a large display, such that the associated additional weight, size, and power dissipation are unnecessary. The technique introduced here overcomes this barrier by separating the requirements of the device from those of the display unit.

In this technique, the mobile device has a very small display or no display at all. This is the normal mode of operation, generally the mobile mode of operation. As a result, the mobile device is small and has low power dissipation. A group of larger displays are designed and made available to the user upon request. These displays vary in features such as size and display resolution. The initial display design can be the size of a business card to be carried in a wallet and used in a similar manner. This display size is adequate for a large number of users in a mobile environment. This detached display can be attachable to the mobile device via direct wire connection or via wireless link. FIGS. 11A, 11B, 11C, and 11D show a wrist-top mobile device with an additional detached wallet-sized display unit 113. The CEO engine plus environmental sensors and/or biosensors are located on the bottom of the mobile device.

Another size display is a letter size display, which can be carried in the user's briefcase among other paperwork and file folders. When a need for such a display arises, such as for editing, viewing documents, photos or videos or presenting such material to a larger group, the letter size is the more appropriate usage model. As in the case of the wallet size display, the connection mechanism is established either via wires or wirelessly depending on the customer's selection at the time of ordering.

In the wireless mode, the display is turned on and is held by the user for viewing, totally detached from the unit. The mobile unit stays nearby, for example in a pocket, purse, or worn on the wrist. The user only holds up the display, which is smaller and less bulky, while having access to all the functionality of the mobile device.

The display is powered by its own rechargeable battery which is recharged with the mobile unit. The display is able to draw power from the handheld device through a wired connection. This is also the mode of operation if the display does not have its own battery (e.g., ultra-light model). In cases where the display unit has a charged up battery but the mobile device is low on battery charge, the mobile device can draw power from the display unit.

Since the display unit is totally separate from the mobile device, with appropriate security measures the user has the possibility to use any appropriate display units other than his own. This means that if for any reason the user does not have access to his display unit, the user can borrow, purchase or rent another display unit.

Text entry on the mobile device can be accomplished through any of several methods, such as through a software keyboard on a touch-screen display, or a small physical keyboard that is stored in the wallet, etc. which can also be attached to the display.

In addition to mobile devices, the display can potentially be used with any other electronic equipment, such as a DVD player which is equipped with the proper communication technology. In this scenario, the user can connect to any information/entertainment device such as a PC, a DVD player, etc., and with proper authorization, can view the information/content on the display.

In one embodiment, several small display units stack up or fold and when needed, they can be opened up where the small displays connect together to form a larger display. Alternatively, additional small displays can be attached to an existing smaller display to form a single larger display.

The detached display allows for a new usage model for sharing of information/shared viewing of content. Multiple display units can be provided to users so they can access the information/content on a single device. Security measures can allow for authentication of the display units which can connect to the device. In addition to point-to-point connectivity, multi-cast connectivity can allow users to access the information on the device. The system allows for the individual display units to act as separate application windows on the mobile device (with proper security features which control guest access). As a result, each display unit can allow the user to independently access authorized services, such as web access, etc. This allows multiple users connectivity and content access without the need for individual devices. This technology provides a robust solution to applications such as multiplayer gaming, presentations, classroom/conference settings/on-the spot access to mobile services, etc.

(2) Time-Based Information System (TIBIS)

(2A) Event-Based Storage, Access & Retrieval

The techniques introduced here include TIBIS, a time-based information system of data organization. TIBIS is particularly suited to implementation in a mobile device such as described above, although it is not limited to a mobile environment. The current PC model of entering, saving and organizing files grew out of the transition from typewriters/word processors/calculators. Although the sophistication of file systems and their many different formats have continued to grow, the fundamental design element for these systems remain packing the most amount of information in the least amount of space and facilitate access to the information while providing data integrity based on the underlying memory hierarchy of the system. Available storage systems lack a higher level of awareness and intelligence, which is particularly evident in mobile device usage scenarios.

While "content" and general-purpose programming/flexibility for applications remains of primary concern in a PC environment, in a mobile environment the primary factor is time. People typically use mobile devices to have access to information on-the-go and to save time. Features of TiBIS allow a hardware and software environment to provide robust storage, integration, recognition, recall and display of time-based activities and events in a user-customizable format.

Currently, most data is stored in electronic form in files. These files are organized in various directories or folders based on the type of file or the relationship of the content of files. The files have a time stamp associated with them. Other than looking up the time stamp when one looks at a file, the only other thing one can do with the time stamp is to sort the files based on time in a given folder or directory.

In addition, files are randomly written in different areas of memory. When a file is deleted, an area in memory becomes available where the file was written before. As more and more files are deleted, more area opens up in memory, but the open (free) areas are not contiguous. This results in fragmentation of data in memory, which results in a slow down of data access.

With TIBIS, all files are organized based on time, with the granularity of time determined by the user. The user can have control over periodic storing of specific information, store information through a direct user command, or any other user-defined mechanism. Activities, multimedia files, etc. are organized in a time snap-shot. As new pieces of information are received or generated, they are written sequentially in memory. Since data that is recorded ("the past") cannot be modified by the user, the stored data is permanently stored in memory. This requires a large amount of memory over time. TIBIS provides a way to ease the requirements on the size of memory and store only information that the user will need in the long-term, while allowing the user to continue to have a snap-shot of all relevant information.

The TIBIS system is organized around two types of memory. One is called the Short-Term Memory (STM) and the other Long-Term Memory (LTM). Initially, information is recorded sequentially in STM. The size of STM is determined by the user and can be very short or very long, depending on the application and user preference (e.g. hours, days, weeks, etc.). During a predetermined amount of "inspection" period, the user has the option of erasing from STM any information deemed unimportant (e.g. an incoming junk email, erroneous file, etc.). In one implementation, the inspection period is chosen to be the amount of time it takes for the STM memory to be filled. At the conclusion of the inspection period, any remaining data is sequentially written to LTM. Any data that is erased from STM memory is not written in LTM. Once data is written in LTM, it can no longer be changed. The option to give the user the ability to erase LTM can be provided by an administrator of the system. If the user exercises the option to erase any part of the time snap-shot in LTM, the memory for that part can not be re-used by other data.

In one implementation, the data in STM can be shifted up through memory as new data is brought in or data can be shifted up once a section of memory is cleared and becomes available. In this way, data always gets stored in contiguous memory locations sequentially according to the time the data is stored, and data-hold time calculations are simplified.

In addition, this memory architecture is designed to allow for user programmability of memory configuration, hybrid time-sector tagging of memory, dynamically varying the time granularity, and finer resolution time snap-shots inside another snap-shot.

In this system, problems with memory fragmentation are therefore resolved, since no rewriting is done in previous segments of memory and data is always written in contiguous sections of memory. In addition, since the memory is written sequentially based on time, one needs to backup any part of memory only once, since contents of past memory cannot be modified (except where the user is given the option of deletion). Therefore, periodic backups of data or changes to the data are not needed.

One way to deal with files that are modified over time is to keep multiple copies of files at each instance where a new version is saved. To reduce memory space, an alternative method can be used where the first instance of the file is saved, and each time the file is modified, a modification list from the previous version is saved. To improve access time, the system can keep a copy of the last modified version in full so no reconstructing is necessary when data is retrieved from memory for editing. This intermediate version is then deleted. Data can also be referenced backward with changes from the latest versions.

TIBIS also provides benefits for data security and information audit. Since the system stores time snap-shots, it is straightforward to review past activities and information. The system also makes it easy to audit past information and activities such as financial transactions, etc.

TIBIS also makes it possible to view a snap-shot of user's life, based on what information the user has chosen to include. This then becomes part of a digital journal of the user's life.

TIBIS removes static applications and content from being the central factor in device architecture. Instead the primary design element of the system is capturing and providing "relevant", "useful" and "timely" event information to the user. Each time snap-shot contains a record of all activities the user chooses to record, store, and/or track for the selected time granularity (e.g., daily, hourly, weekly). A time snap-shot records all relevant information, such as physical location coordinates of the mobile device (or other type device that is implementing TIBIS), any information received, transmitted, captured, created or opened by the device, conversations of the user, etc. The information can include any type of multi-media data such as audio, video, email, text, etc. The system has provisions for a set of information repositories that include all files of the appropriate type (e.g., an audio repository includes all audio files generated, received or stored by the user).

Figure 12:
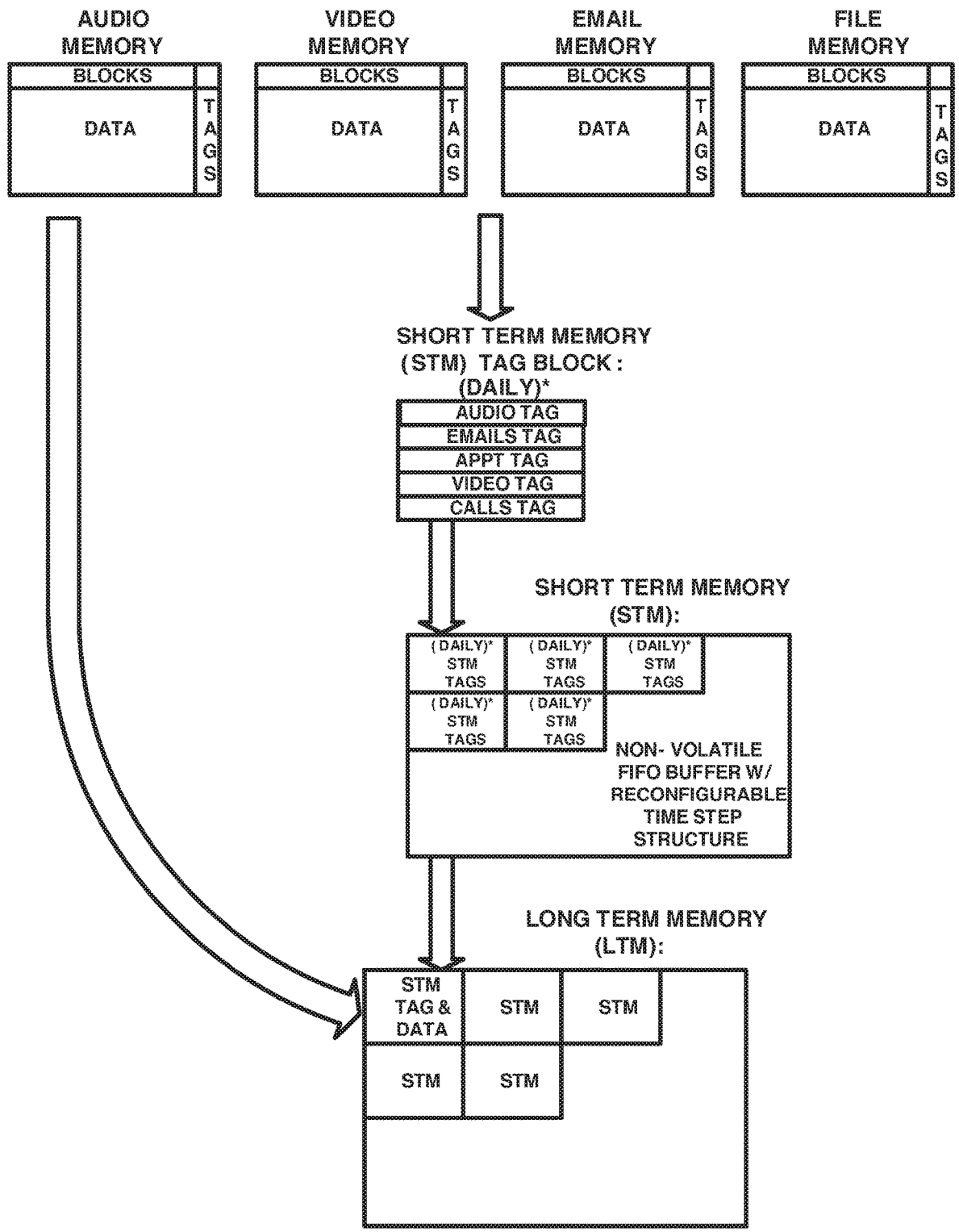
FIG. 12 is block diagram illustrating the Horizontal Repository Architecture.

FIG. 12 shows an embodiment of the Horizontal Repository Architecture (HM™) of TIBIS. Each functional module (e.g., audio, video, e-mail, etc.) of the mobile device (or other type of processing system implementing TIBIS) has its own separate memory. Each stored content item also has a tag which lists all the relevant information (metadata) for that item, which is stored along with the item in a repository. All of the tags from each function's memory are collected for the selected time period (e.g., daily) and stored together as a super-block, or "time snap-shot", in STM. At the appropriate time (e.g., when STM is reaches a pre-defined time limit), in one embodiment the user is prompted to examine the tags and determine which contents and tags they wish to preserve. In the absence of additional user input, the mobile device makes the decision based on an initial programming default. In the aforementioned embodiments, the chosen contents of STM along with the accompanying data as chosen by the user are written to LTM, and STM is cleared or overwritten. In another embodiment, the data moves through a window of a given STM cycle, e.g. 30-days, while at the same time each time snapshot (e.g. daily) is transferred to LTM in a first-in first-out (FIFO) output manner. The time snap-shot has links to any blocks of data in the relevant repository that is accessed in the given time period. When data is moved to LTM, all content is saved in the LTM entry or the user can choose to keep only the pointer to the content in the repository.

(2B) Memory Hierarchy & Time Based Architecture:

In implementing this unique storage and retrieval technology, HM units for each device are provided to match the device's storage and access requirements. This means that individual functions' memory storage can be changed over time, and different or same memory technologies may be used for different types of data storage and access requirements.

Figure 13:
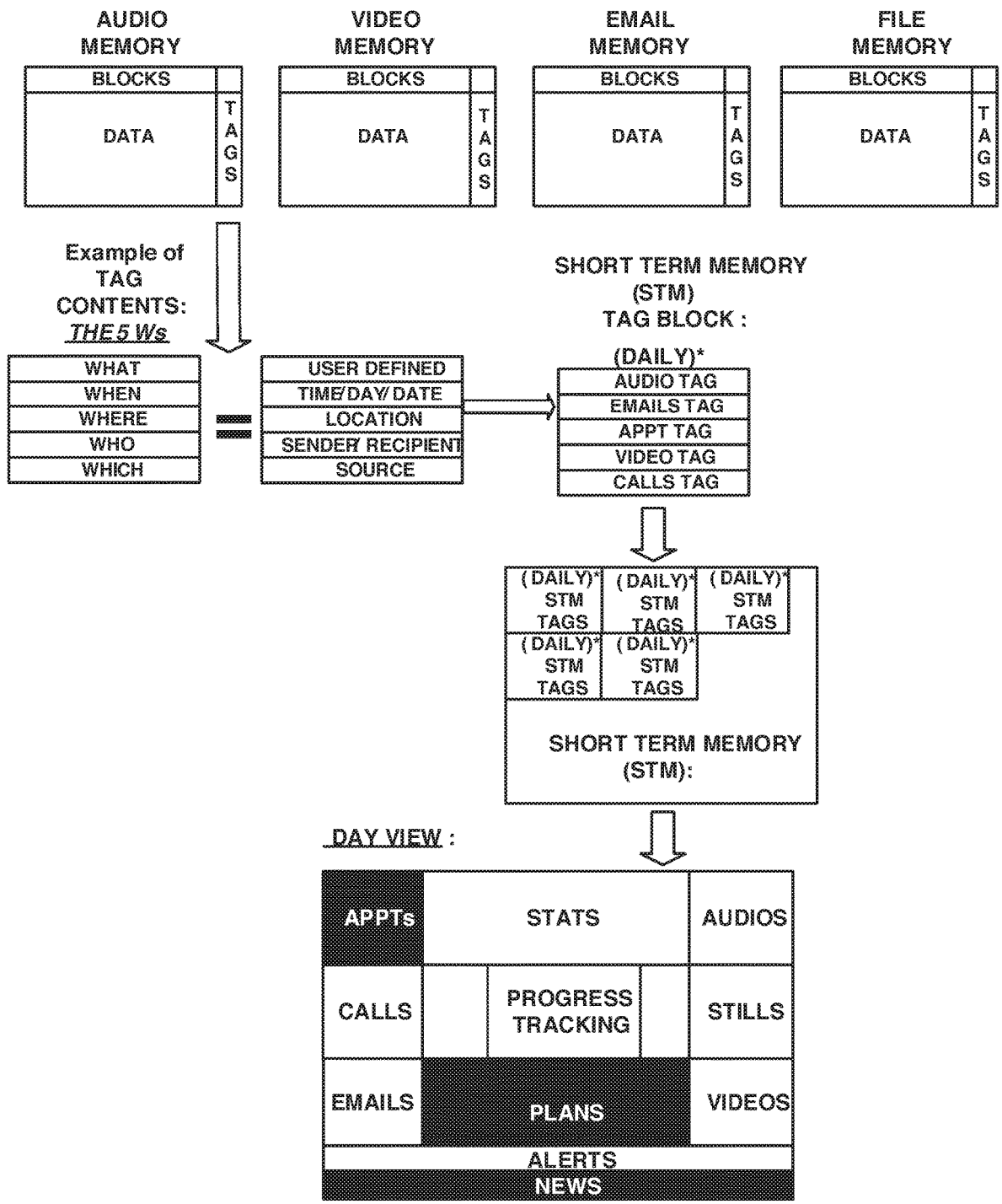
FIG. 13 shows an example of the generation and processing of tags in the time-based memory organization.

In addition to providing distinct and in some cases detachable, removable, expandable HM memory units, each stored item such as data, music, still photo or video is stored with a particular tag structure. FIG. 13 shows the generation and processing of tags in the time-based memory organization. Each tag is appended to the actual stored element in a predetermined set of extended locations. A tag typically includes metadata that answers one or more of the five questions: "what" (can be user-defined), "when" (e.g., time/ day/date), "where" (location of the device), "who" (e.g., sender and/or recipient of a message) and "which" (e.g., source). Each function of the device (e.g., audio, video, etc.) generates its own type of tag. For a given time period (e.g., one day), the various tags are collected into a single tag block, which is saved in STM. Note that there can be more tag categories than the above suggested five for certain applications.

The contents of STM can therefore be used to provide a complete "day view" to the user for multiple days, or similar view for any other selected time period. Upon a request for retrieval of data, a fast search mechanism is then able to retrieve the data element by hardware, and in some cases software, by comparing only the tags of data elements. In case a tag comparison results in multiple hits, the reduced set of data elements (tag hits) is then subjected to a further search in a much reduced complexity and time.

An example of a simplified tag generation scheme is as follows: Upon taking a photograph with the still camera module, the location coordinates are retrieved automatically via the on-board GPS location module. This information is then cross-referenced against the personal address space of the user as well as the calendar information to determine the exact location where the user is likely to be. This can be further clarified by posing a question to the user for a final clarification. The "actual" verified location is then part of the tag associated with the photograph. Further, the time and date is known, which is cross-referenced against the user's calendar and "dates of importance" file in the user preferences directory. This clarifies the exact occasion and can be even further clarified by posing a question to the user. This information also becomes part of the tag. In trying to retrieve or recall the photo, the user only needs to remember a part of the tag to be able to access the desired photo or information in general.

Further features of the tag can include character recognition as well as pattern and voice recognition. Upon storage, a sample of all such available modalities of the file becomes part of the tag. In recalling this information or in trying to organize and archive, over time user preferences can be allowed to change to include something such as presence of a certain person in the photo, rather than using the more simplified versions of the tag.

If a typical storage element (type of file element) for a module is, for example, 256 bits and a memory word is 16 bits, then it takes 16 rows of data to store this element. If the design parameters allow up to 20 bits for the data and tag space, then up to 64 bits can be used for a tag (4 bits*16 words). If the storage element is 1 Kb for the same overall bit width of 16+4, then one needs 64 words to store that element. In this case one can have up to 256 bits for a tag.

In general, the tags are uniformly designed so that for most data types and functional modules, one can go up to a certain maximum size tag. For example, if all one needed is 64 bits, then for the rest of the words, the tag can be either repeated or driven to an agreed upon level. The implementation is design dependent.

In certain embodiments, a tag is proportionally as wide as the ratio of its functional module's typical data element size to the maximum required tag size. In this case the tag and data are proportionally assembled and disassembled. In other embodiments, the tag may get appended to the first or last data word and recognized with an end-of-element flag. In yet another embodiment, the tag always gets stored in its entirety and then the data element begins.

In certain embodiments, the tags are fixed in size and the memory word size and depth is a design element based on each module's typical element size and timing requirements for the control signals. In some cases, the row of data to tag ratio is determined specifically for each functional module and data type. Hence, customization happens at the module level even for memory.

Figure 14:
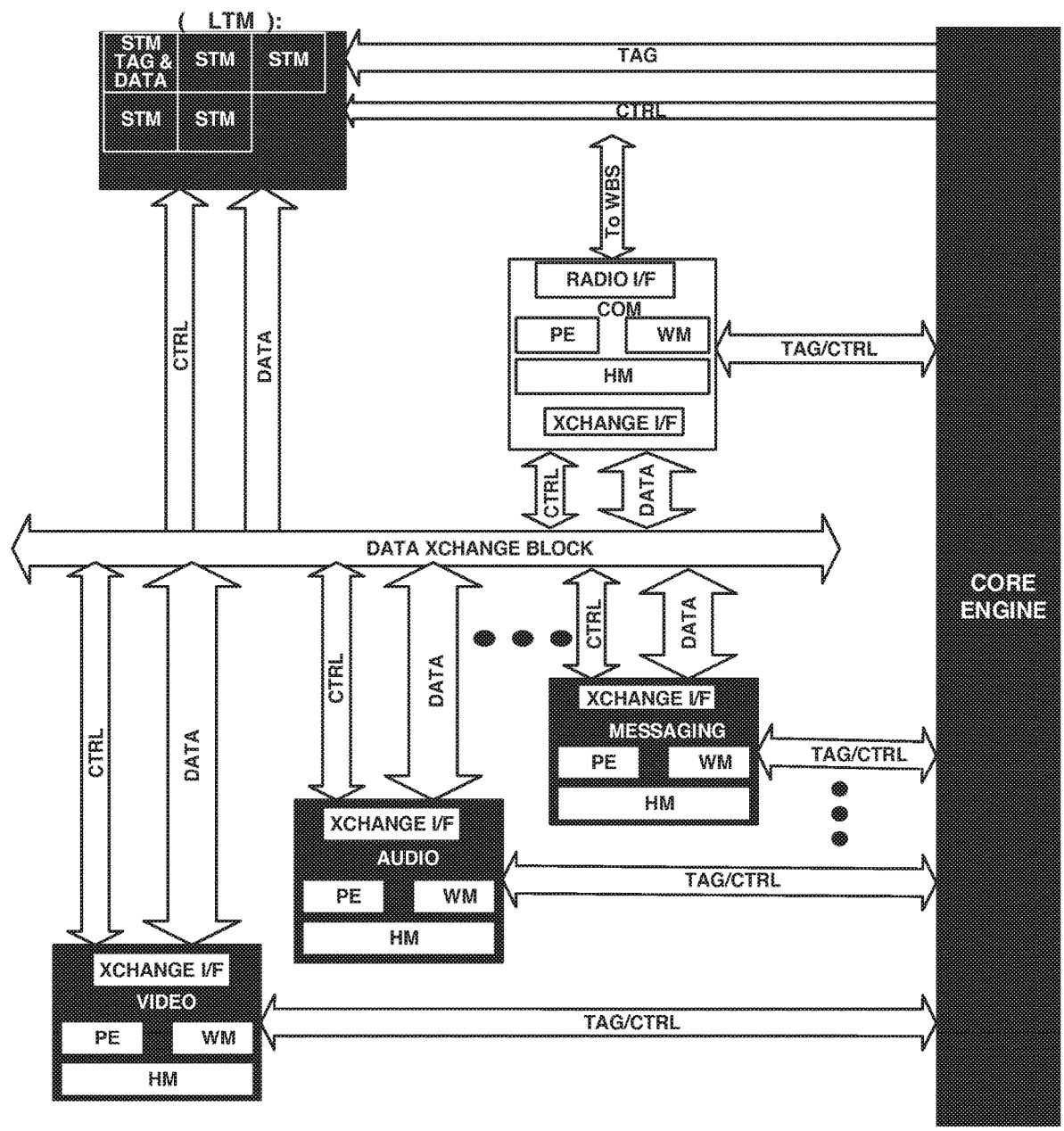
FIG. 14 shows the data flow of the modularized mobile architecture with a time based information system (TIBIS™)

FIG. 14 shows the data flow of the Modularized Mobile Architecture with TIBIS, according to one embodiment. FIG. 14 is essentially identical to FIG. 4, except that it further shows the LTM in relation to the CEO engine and the functional modules. In at least some embodiments, the STM is implemented as memory that resides within the CEO engine. Further, in the illustrated embodiment the LTM is separate from the CEO engine and is coupled to the data exchange block through separate control and data lines and to the CEO engine through separate control and tag lines. In other embodiments, the LTM is implemented as memory within the CEO engine. The LTM can be designed as a removable module, so that it can be saved for archiving purposes as needed.

One of the tasks handled by the CEO engine is assembling the STM blocks and coordinating the transfer of information to the LTM blocks. In addition, once the tags are generated and STM blocks are assembled, the CEO engine has access to a lot of well-organized information which forms the basis of efficient operations for robust organization and planning. These operations are controlled by the CEO engine.

Figure 15:
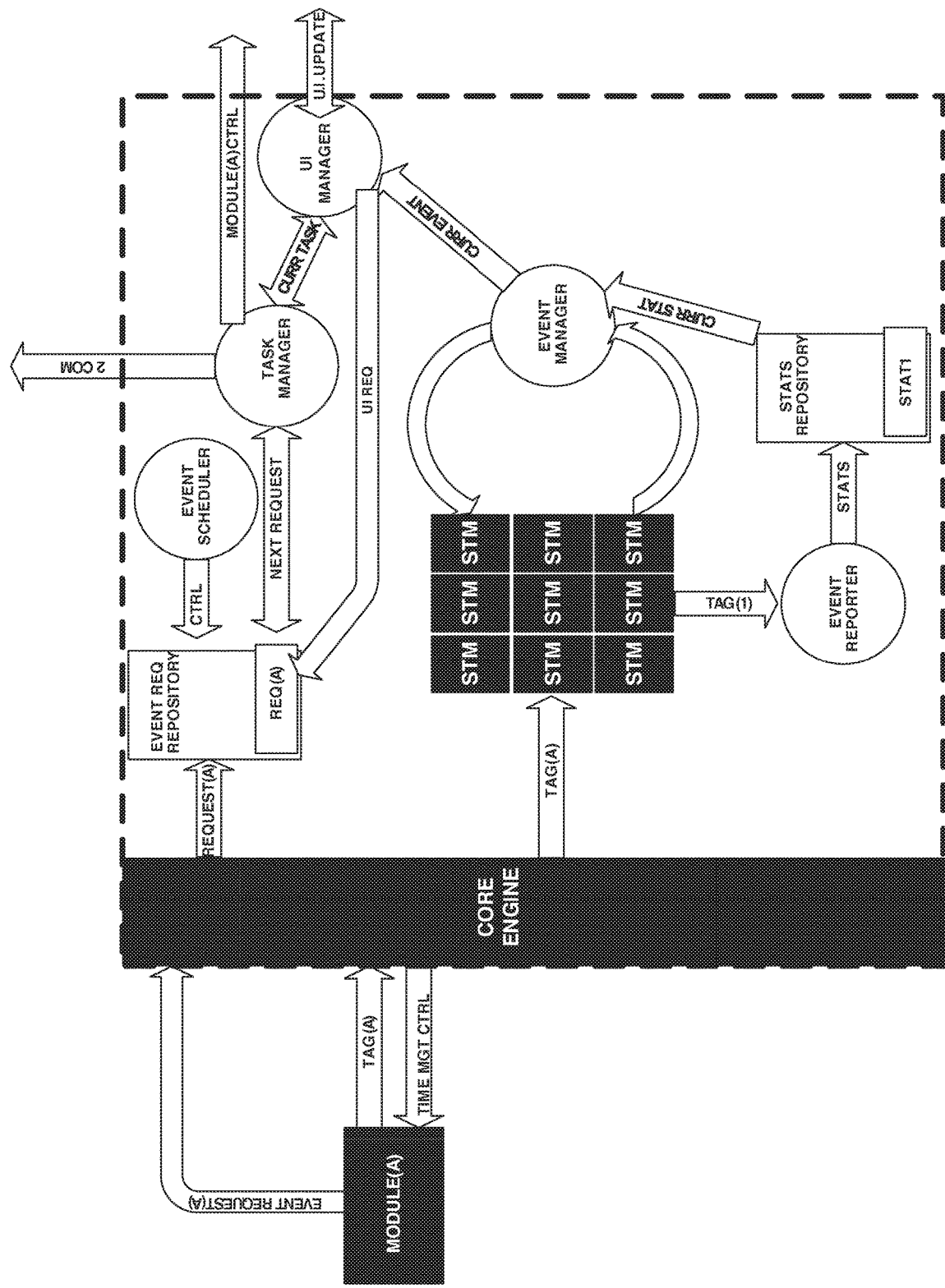
FIG. 15 shows the TIBIS operations facilitated by the CEO engine.

FIG. 15 shows TIBIS operations that are facilitated by the CEO engine. As shown, the main functions/sub-modules of the CEO engine (which is represented by the dashed box) are:

Event Reporter. Collects information from stored tags and generates statistics on specific categories.

Event Manager: Monitors all current and short term plans and updates the timing schedule.

Event Scheduler Monitors all module and machine generated requests for automated actions and places entries in the schedule.

Task Manager: Collects all requests for automated user and machine generated tasks and contacts the communications module for data, voice communication when available to perform automated tasks.

Module Data Manager and Module Tag Manager: Generate control signal to release data to/from the data exchange block and send and receive tag information from specific modules to the CEO engine to perform TIBIS related tasks.

User Interface (UI) Manager: Interfaces all time/event management functions to the user interface blocks driving this information to the user interface based on user request profiles. The UI Manager block takes the prioritized tasks and events as well as "stats" and "plans" supplied by the elements in the GSM engine and displays the information according to a pre-selected format onto the display.

(2C) Store-Well, Retrieve-Well™

The current state of the Internet is an excellent example of what happens when all sorts of information is available to users in an unorganized manner the problem is how does one find what one is looking for. Design of the next level of search algorithms, semantics web, video search, etc. is well under way, and undoubtedly there will be improvements. It remains, however, that information is being added to the Web at a far greater rate than the rate at which the algorithms are improving.

The problem of information retrieval for a mobile user can be addressed by an integrated solution that will now be described. For organization and storage, the solution introduced here provides a mechanism to collect enough information from the user to be able to automatically store the information in an appropriate manner and retrieve it easily without resorting to a complex and computationally intensive search. Even though it is comfortable to talk about "locations" when discussing files and information (something inherited from folders in file drawers days), it is becoming irrelevant and quite limiting to discuss locations when there are millions of files and bits of information generated every hour. It is more appropriate to understand the uniqueness of each multimedia file as it is received/acquired and store it in a way that future retrieval is seamless to the user and archiving, backup, deletions, etc. happen automatically. Such an approach increases productivity while reducing security and accessibility issues.

Figure 16:
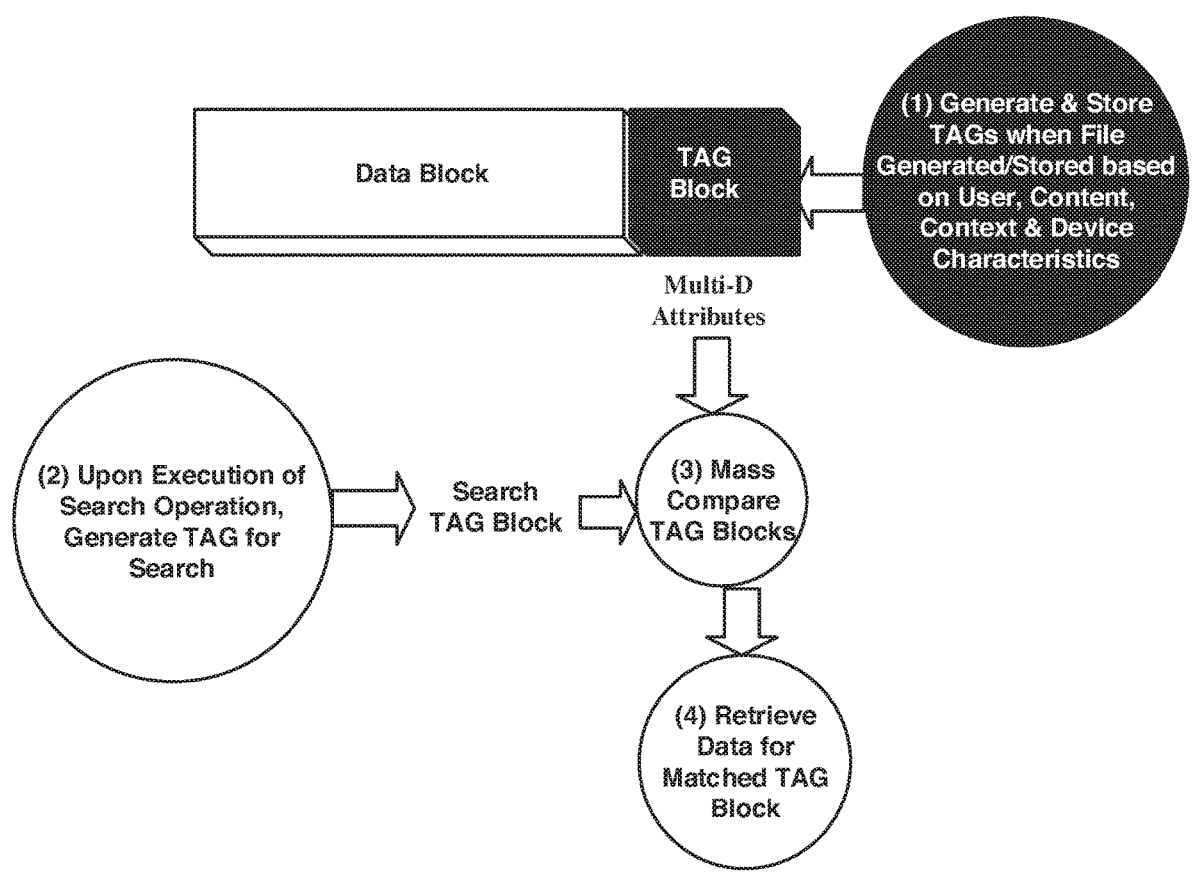
FIG. 16 illustrates an example of an algorithm for tag and content searches.

As described above, based on information type, user selection, activity and usage model the system generates and updates multi-dimensional tags for each piece of information (e.g. audio file, email, etc.) that the system handles. For each search/inquiry, a corresponding search tag is generated. The search tag is compared with the stored information tags by in at least some instances by pure hardware (i.e., without using software), resulting in a very fast search. Content addressable memory (CAM) technology can be used to provide high-speed implementation. A combination of hardware and software implementation can be used for the tag and content searches in certain instances, depending on the specific nature of the search. FIG. 16 illustrates the intelligent storage, search and retrieval technique described here, according to one embodiment.

(3) System-Level View

Figure 17:
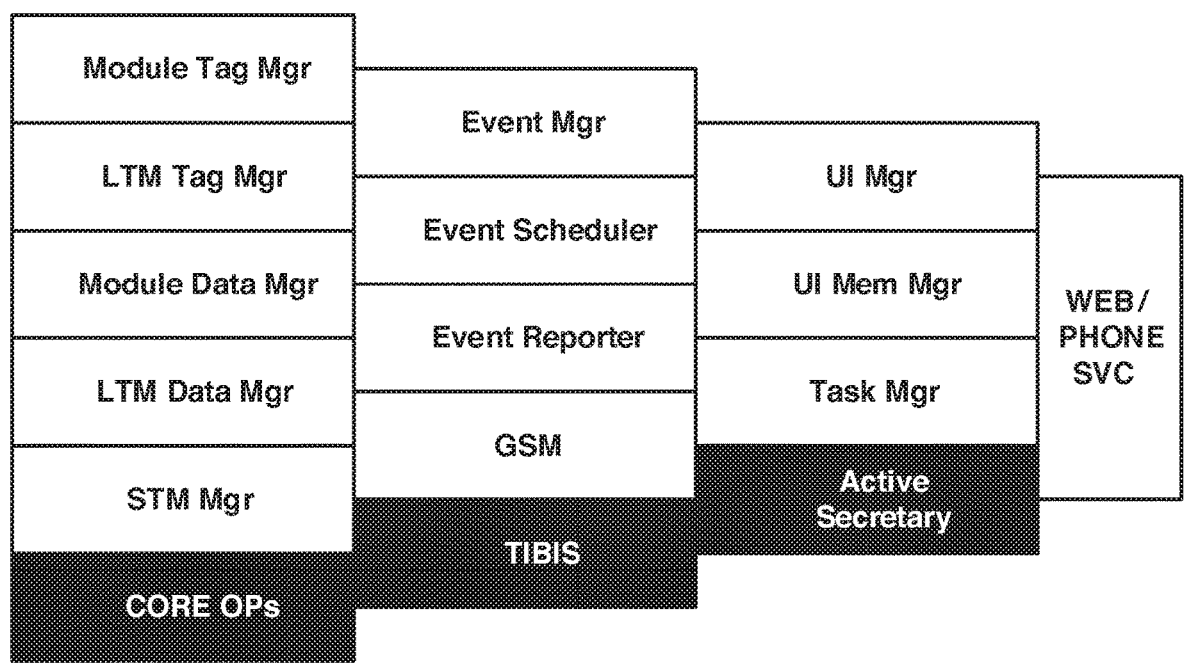
FIG. 17 shows a system level-view of hardware and software elements in a mobile device in accordance with the techniques introduced here.

FIG. 17 shows an overall system level view of functions of a mobile device such as described above, according to one embodiment. All operations within the mobile device can have a combination of software and hardware elements, with the CEO engine operations being primarily hardware-based. The CEO engine manages functional module operations and does STM and LTM management. The TIBIS engine encompasses the GSM operations within the CEO engine and manages the relevant operations for event handling.

The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A wearable electronic device comprising:
   a core engine including a processing element and a memory element operably connected to said processing element,
   two or more components each including a processing element and a memory element operably connected to said processing element,
   a data exchange block,
   one or more wearable mechanisms,
   wherein each of said components is independently functional
   and dedicated to perform a designated functionality,
   wherein said device is configured to be worn on the body of the user of said device through a wearable mechanism,
   wherein said components and said core engine electrically connect through said wearable mechanism, wherein one or more of said components is detachable from said wearable mechanism and is independently operable,
   wherein said core engine coordinates the operation of said device through communicating with said components solely through control bits,
   wherein said core engine through said control bits enables direct component to component transfer of data among two or more of said components with different data interface characteristics by facilitating assembling or disassembling of data at the component interface of one of said components to match the other component's data bit width and timing, and
   wherein data transfer occurs among said two or more components in attached mode through said data exchange block without transfer of data to or from said core engine.

2. The device of claim 1, wherein said components are swappable with other components to change functionality or form factor of said device.

3. The device of claim 1, wherein at least one of said components provides wireless connectivity to a cellular or wide-area network, and is removable, enabling an upgrade to wireless communication technology or a change in wireless service provider without modification to the mobile device or any other components of the device.

4. The device of claim 1, wherein one of said components provides data and voice communication capability including microphone and speaker, and is detachable from said wearable mechanism and is independently operable.

5. The device of claim 1, wherein at least one component has a battery and can charge the wearable device or another component.

6. The device of claim 1, wherein the memory element of one or more of said components includes data and tags, wherein said tags are content metadata for data elements within said components, wherein said core engine receives said tag information from said components.

7. The device of claim 1, wherein said core engine keeps track of the components with displays that are presently attached to said wearable mechanism and wherein said core engine sends the appropriate control signals to the circuitry for resizing the image appropriately to resize the screen so said device has a larger display in attached mode comprised of said smaller displays.

8. An electronic device comprising:
a core engine including a processing element and a memory element operably connected to said processing element,
two or more components each including a processing element and a memory element operably connected to said processing element,
one or more detached displays,
a data exchange block,
wherein each of said components are independently functional
and dedicated to perform a designated functionality,
wherein said device is further comprised of a housing unit,
wherein said components and said core engine electrically connect through said housing unit, wherein said core engine coordinates the operation of said device through communicating with said components and said one or more displays solely through control bits,
wherein said core engine through said control bits enables direct component to component transfer of data among two or more of said components with different data interface characteristics by facilitating assembling or disassembling of data at the component interface of one of said components to match the other component's data bit width and timing,
wherein one or more of said components are detachable from said housing unit, wherein data is transferred among two or more of said components in attached mode, through said data exchange block, without data being transferred to or from said core engine.

9. The device of claim 8, wherein said components are swappable with other components to change functionality or form factor of said device.

10. The device of claim 8, wherein at least one of said components provides wireless connectivity to a cellular or wide-area network, and is removable, enabling an upgrade to wireless communication technology or a change in wireless service provider without modification to the mobile device or any other components of the device.

11. The device of claim 8, wherein one of said components provides data and voice communication capability including microphone and speaker, and is detachable from the housing and is independently operable.

12. The device of claim 8, wherein the memory element of one or more of said components includes data and tags, wherein said tags are content metadata for data elements within said components, wherein said core engine receives said tag information from said components.

13. The device of claim 8, wherein said core engine keeps track of the components with displays and individual display units that are presently attached to said housing and sends the appropriate control signals to the circuitry for resizing the image appropriately to resize the screen so said device has a larger display in attached mode comprised of said smaller displays.

14. A method for an electronic device comprising:
said device comprising of two or more functionally independent components, one or more wearable mechanisms, a data exchange block, a core engine,
wherein, said wearable mechanism electrically connecting said components and said core engine,
wherein one or more of said components detaching from said wearable mechanism are independently operable and designated to perform a specific functionality,
wherein said two or more components comprising of a processing element and a memory element operably connected to said processing element,
wherein said core engine coordinating the operation of said device,
wherein said core engine communicating with said components solely through control bits,
wherein said core engine's control bits enabling direct component to component transfer of data among two or more of said components with different data interface characteristics by facilitating assembling or disassembling of data at the component interface of one of said components to match the other component's data bit width and timing,
wherein two or more of said components in attached mode, transferring data directly to each other through said data exchange block without data being transferred to or from said core engine.

15. The method of claim 14, wherein said housing unit includes a wearable mechanism capable of attaching to the body of a user.

16. A method for an electronic device comprising:
said device comprising of two or more functionally independent components, a housing unit, a data exchange block, a core engine, one or more detached displays,
wherein, said housing unit electrically connecting said components and said core engine,
wherein one or more of said components detaching from said housing unit is independently operable and designated to performing a specific functionality,
wherein two or more of said components comprising of a processing element and a memory element,
said core engine coordinating the operation of said device,
said core engine communicating with said components solely through control bits,
wherein said core engine enabling direct component to component transfer of data among two or more of said components with different data interface characteristics by facilitating assembling or disassembling of data at the component interface of one of said components to match the other component's data bit width and timing,
wherein two or more of said components in attached mode, transferring data directly to each other through said data exchange block without data being transferred to or from said core engine.

* * * * *

UNITED STATES PATENT AND TRADEMARK OFFICE
CERTIFICATE OF CORRECTION

PATENT NO. : 10,706,111 B1
APPLICATION NO. : 15/474721
DATED : July 7, 2020
INVENTOR(S) : Nasserbakht et al.

Page 1 of 1

It is certified that error appears in the above-identified patent and that said Letters Patent is hereby corrected as shown below:

In the Drawings

Figure 7A:
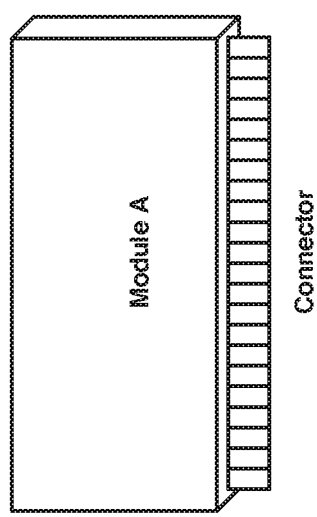
FIG. 7A shows a functional module in detachable form, such as may be associated with another embodiment.
Figure 7B:
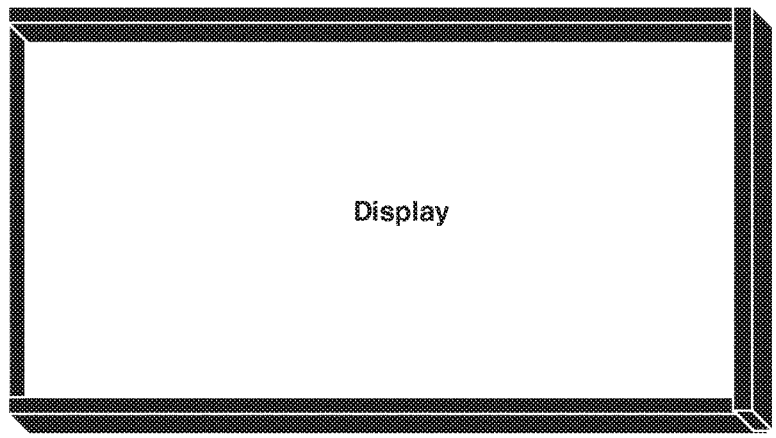
FIG. 7B shows a display device that may be used in conjunction with the functional modules in FIG. 7A.
Figure 7C:
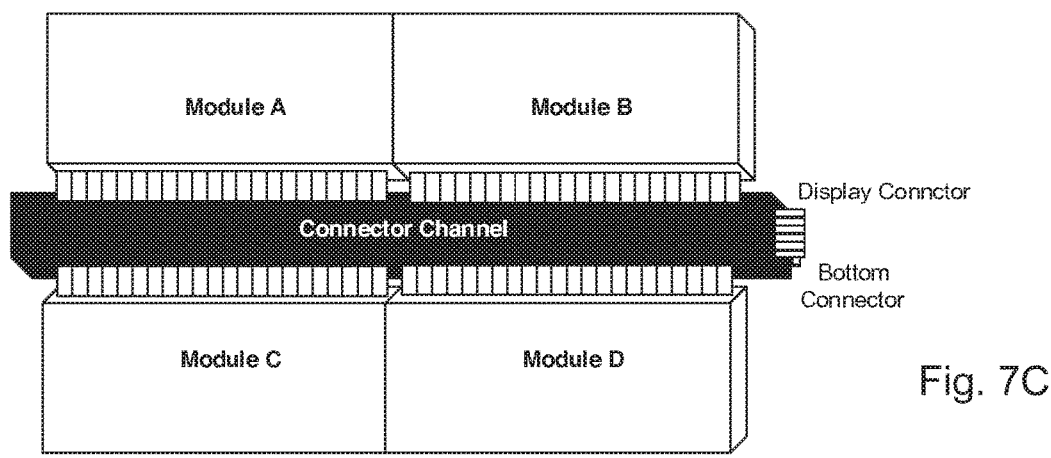
FIG. 7C shows multiple detachable functional modules connected to a connector channel.
Figure 7D:
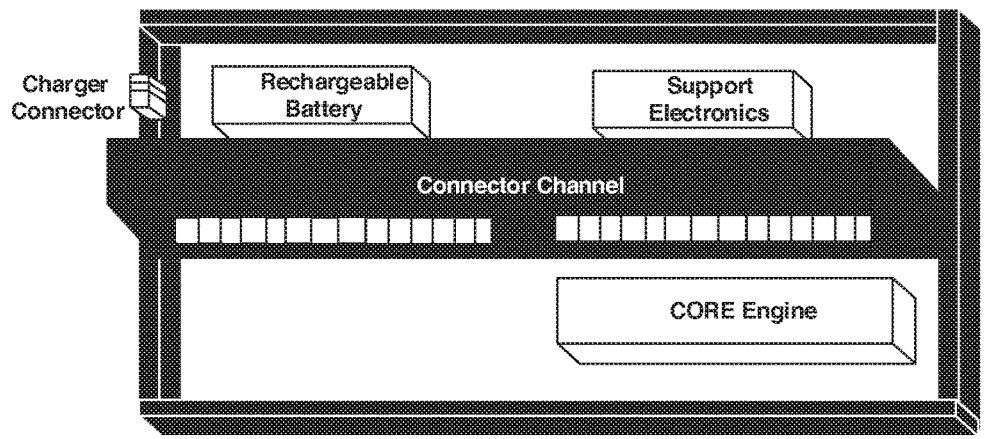
FIG. 7D shows a CEO engine and other components of the mobile device connected to a circuit board.
Figure 7E:
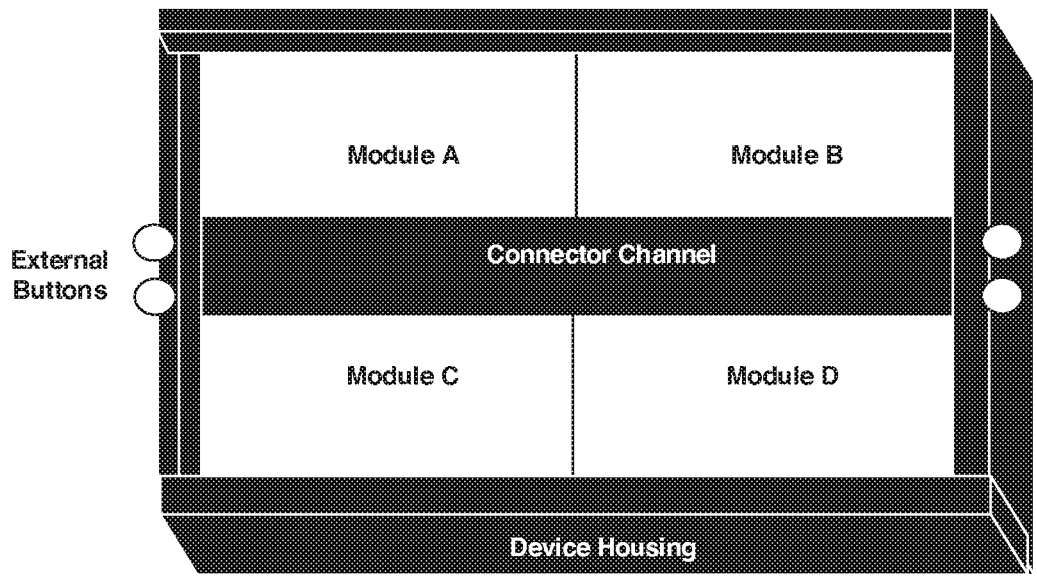
FIG. 7E shows the functional modules and connector channel of FIG. 7C mounted within a device housing.
Figure 7F:
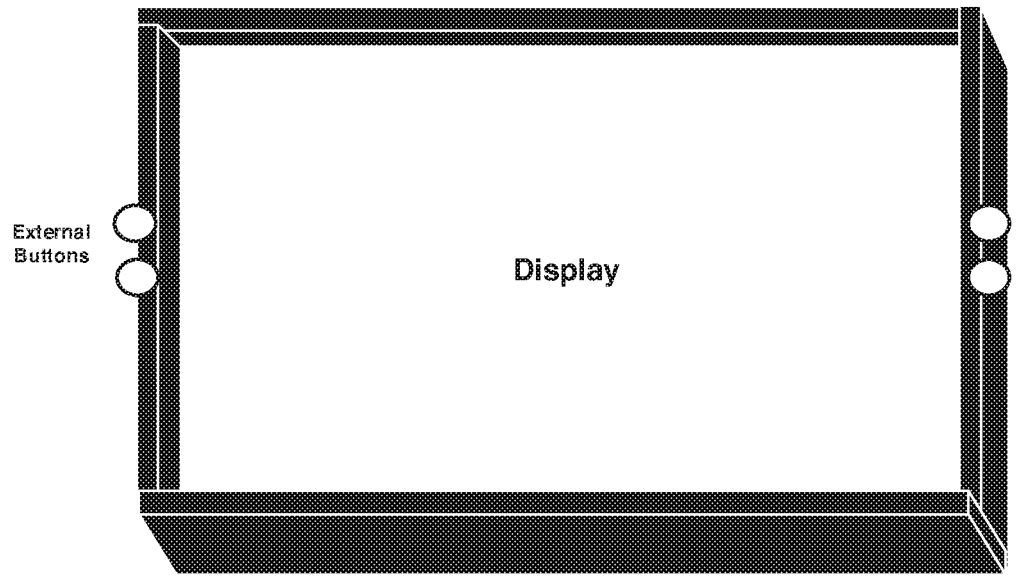
FIG. 7F shows an example of an external view of the assembled mobile device, according to the embodiment of FIGS. 7A through 7E.

Sheet 9 of 22, Fig. 7C, delete "Connctor" and insert --Connector-- therefor

In the Specification

In Column 5, Lines 31-32, delete "pedormance." and insert --performance.-- therefor In Column 10, Line 8, delete "Figure BA," and insert --Figure 8A,-- therefor In Column 13, Line 7, delete "s" and insert --is-- therefor In Column 18, Line 31, delete "Reporter." and insert --Reporter:-- therefor In Column 18, Line 35, after "Scheduler", insert --:--

In Column 18, Line 56, after "manner", insert --;--

In the Claims

In Column 20, Line 59, in Claim 6, delete "components," and insert --component,-- therefor In Column 21, Line 48, in Claim 12, delete "components," and insert --component,-- therefor Signed and Sealed this
Fifth Day of January, 2021

Andrei Iancu
*Director of the United States Patent and Trademark Office*